No. 773,100. PATENTED OCT. 25, 1904.
W. RABICH, G. REIN & L. EHRLICH.
CALCULATING MACHINE.
APPLICATION FILED JAN. 9, 1899.
NO MODEL. 11 SHEETS—SHEET 1.

WITNESSES:
Wm. McCarthy
William Muzzy

INVENTORS.
William Rabich, Leo Ehrlich
and Gustav Rein.
BY Alvan Macauley
ATTORNEY.

No. 773,100. PATENTED OCT. 25, 1904.
W. RABICH, G. REIN & L. EHRLICH.
CALCULATING MACHINE.
APPLICATION FILED JAN. 9, 1899.
NO MODEL. 11 SHEETS—SHEET 2.

WITNESSES:
Wm McCarthy
William Thuzzy

INVENTORS.
William Rabich, Gustav Rein
and Leo Ehrlich
BY Alvan Macauley
ATTORNEY.

No. 773,100. PATENTED OCT. 25, 1904.
W. RABICH, G. REIN & L. EHRLICH.
CALCULATING MACHINE.
APPLICATION FILED JAN. 9, 1899.
NO MODEL. 11 SHEETS—SHEET 4.

Fig. 4.

WITNESSES:

INVENTORS.
William Rabich, Gustav Rein
and Leo Ehrlich
BY Alvan Macauley
ATTORNEY.

No. 773,100. PATENTED OCT. 25, 1904.
W. RABICH, G. REIN & L. EHRLICH.
CALCULATING MACHINE.
APPLICATION FILED JAN. 9, 1899.
NO MODEL. 11 SHEETS—SHEET 5.
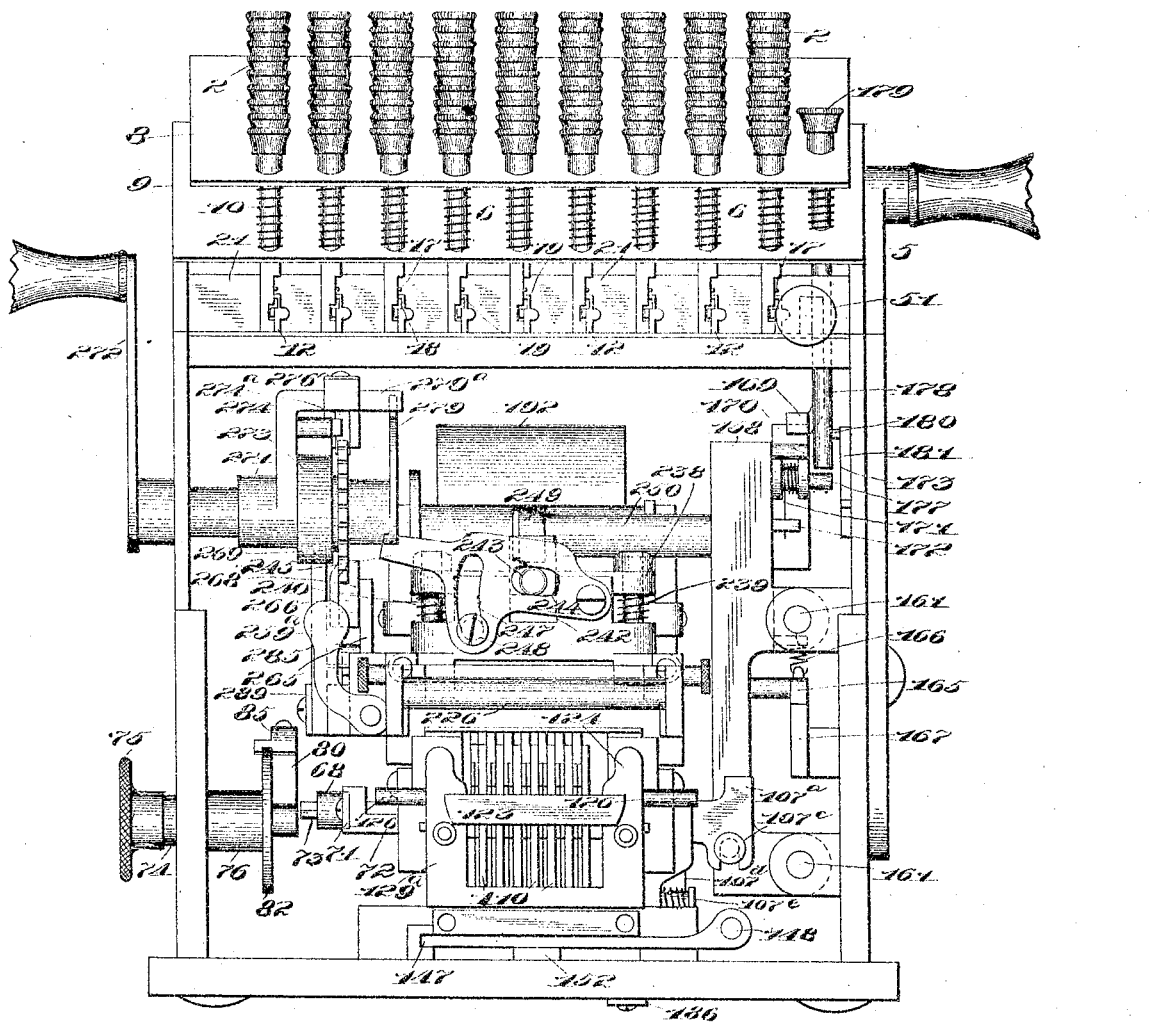

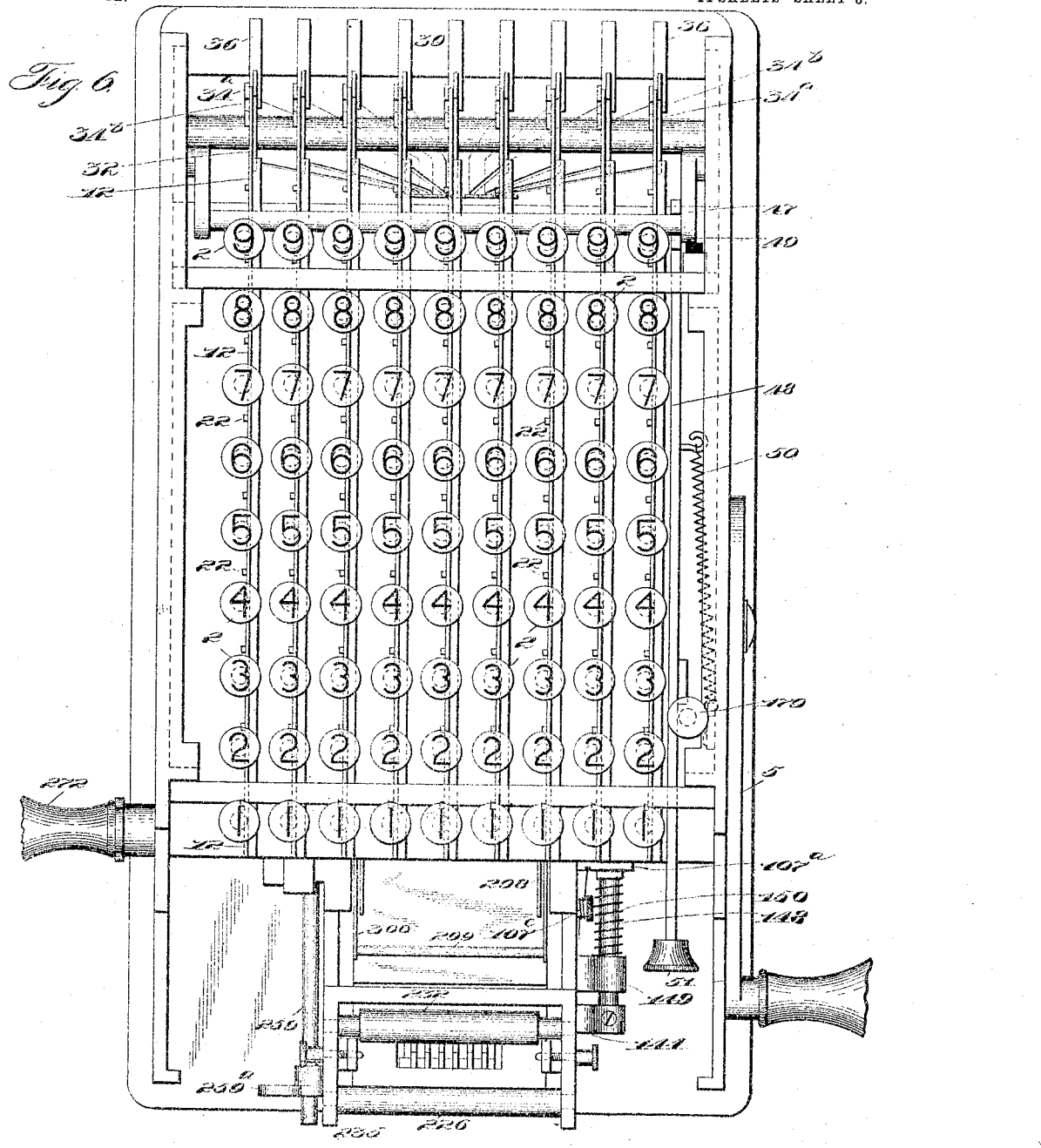

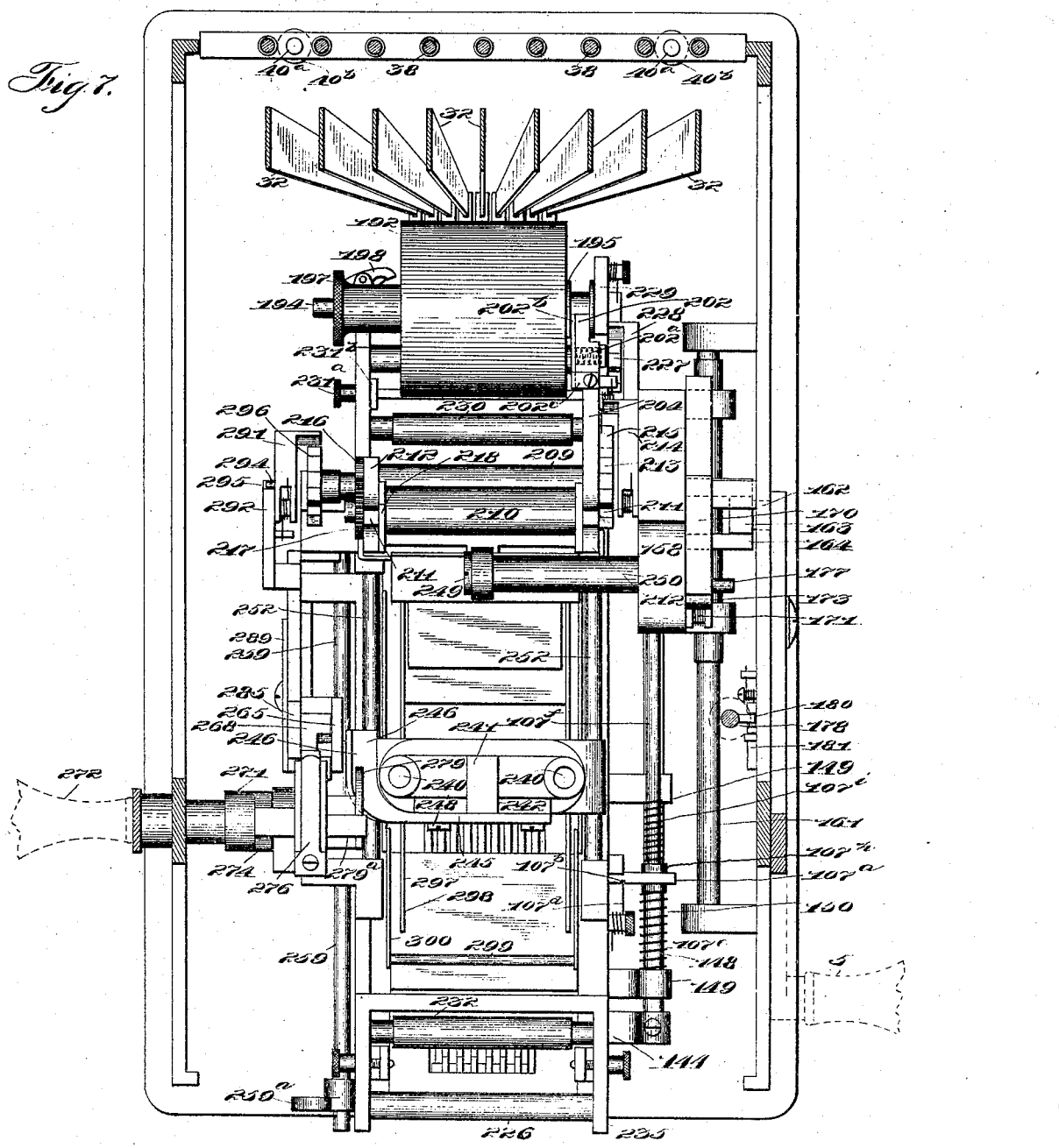

No. 773,100. PATENTED OCT. 25, 1904.
W. RABICH, G. REIN & L. EHRLICH.
CALCULATING MACHINE.
APPLICATION FILED JAN. 9, 1899.
NO MODEL. 11 SHEETS—SHEET 8.
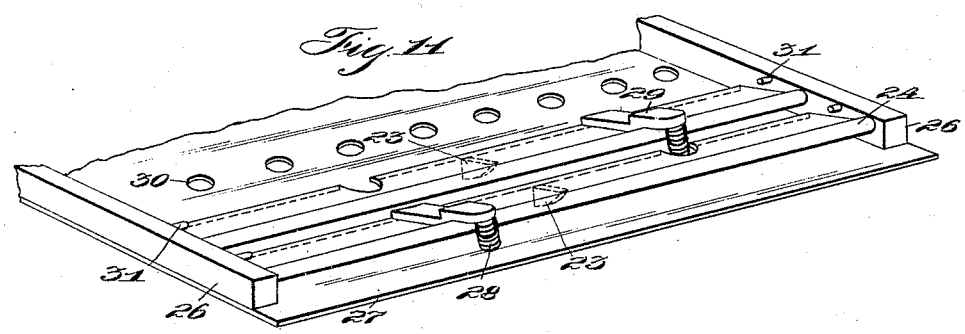
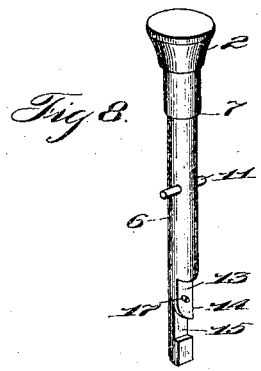
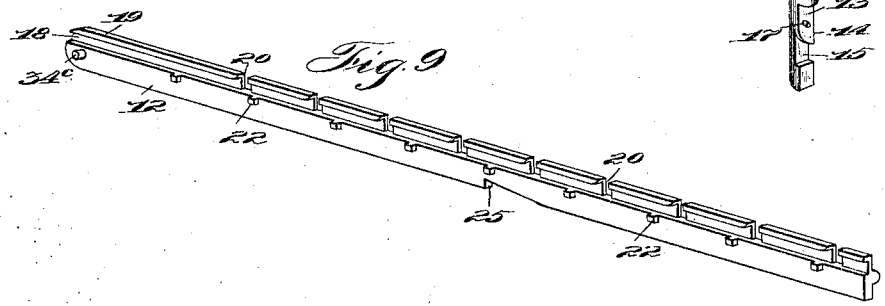
WITNESSES:
Wm. McCarthy
William Muzzy
INVENTORS.
William Rabich, Gustav Rein
& Leo Ehrlich
BY Alvan Macauley
ATTORNEY.

No. 773,100. PATENTED OCT. 25, 1904.
W. RABICH, G. REIN & L. EHRLICH.
CALCULATING MACHINE.
APPLICATION FILED JAN. 9, 1899.

NO MODEL. 11 SHEETS—SHEET 9.

Fig. 10.

No. 773,100. PATENTED OCT. 25, 1904.
W. RABICH, G. REIN & L. EHRLICH.
CALCULATING MACHINE.
APPLICATION FILED JAN. 9, 1899.
NO MODEL. 11 SHEETS—SHEET 10.
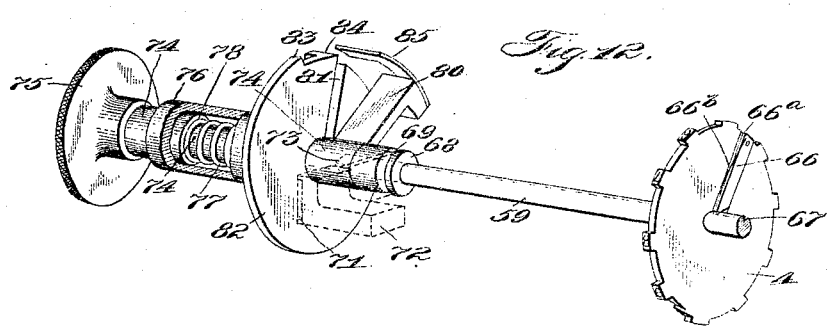
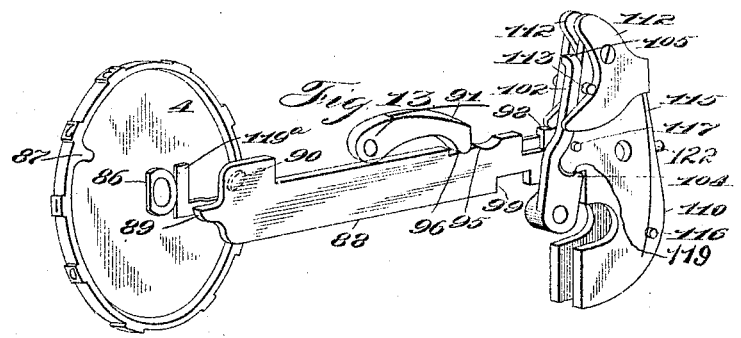
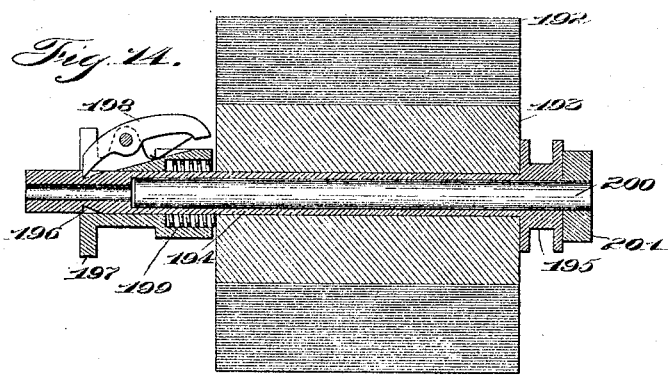
WITNESSES:
Wm McCarthy
William Muzzy
INVENTORS
William Rabich
Gustav Rein
Leo Ehrlich
BY Alvan Macauley
ATTORNEY.

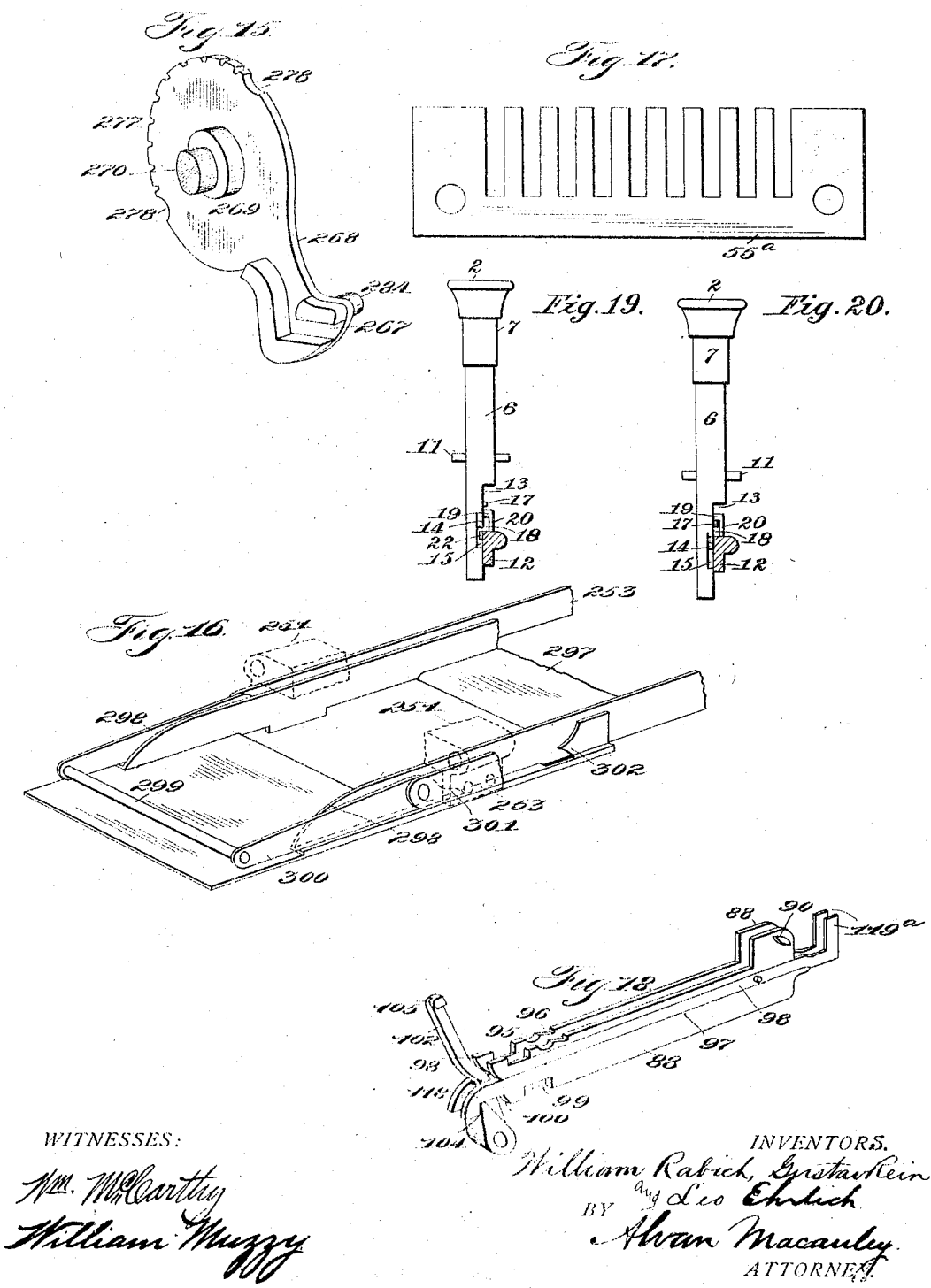

No. 773,100. Patented October 25, 1904.

UNITED STATES PATENT OFFICE.

WILLIAM RABICH, GUSTAV REIN, AND LEO EHRLICH, OF ST. LOUIS, MISSOURI, ASSIGNORS, BY MESNE ASSIGNMENTS, TO NATIONAL CASH REGISTER COMPANY, OF JERSEY CITY, NEW JERSEY, A CORPORATION OF NEW JERSEY.

CALCULATING-MACHINE.

SPECIFICATION forming part of Letters Patent No. 773,100, dated October 25, 1904.

Application filed January 9, 1899. Serial No. 701,692. (No model.)

*To all whom it may concern:*

Be it known that we, WILLIAM RABICH, GUSTAV REIN, and LEO EHRLICH, citizens of the United States, residing at St. Louis, in the State of Missouri, have invented certain new and useful Improvements in Calculating-Machines, of which we declare the following to be a full, clear, and exact description.

This invention relates to improvements in adding or calculating machines, and has more particular relation to the type of machine which prints a detail of each number or amount registered by the keys and also at will the sum or total of all of the amounts registered.

One of the several objects of the invention is the improvement of the printing mechanism and the devices connecting it with the amount-keys and the operating-handle.

Figure 1:
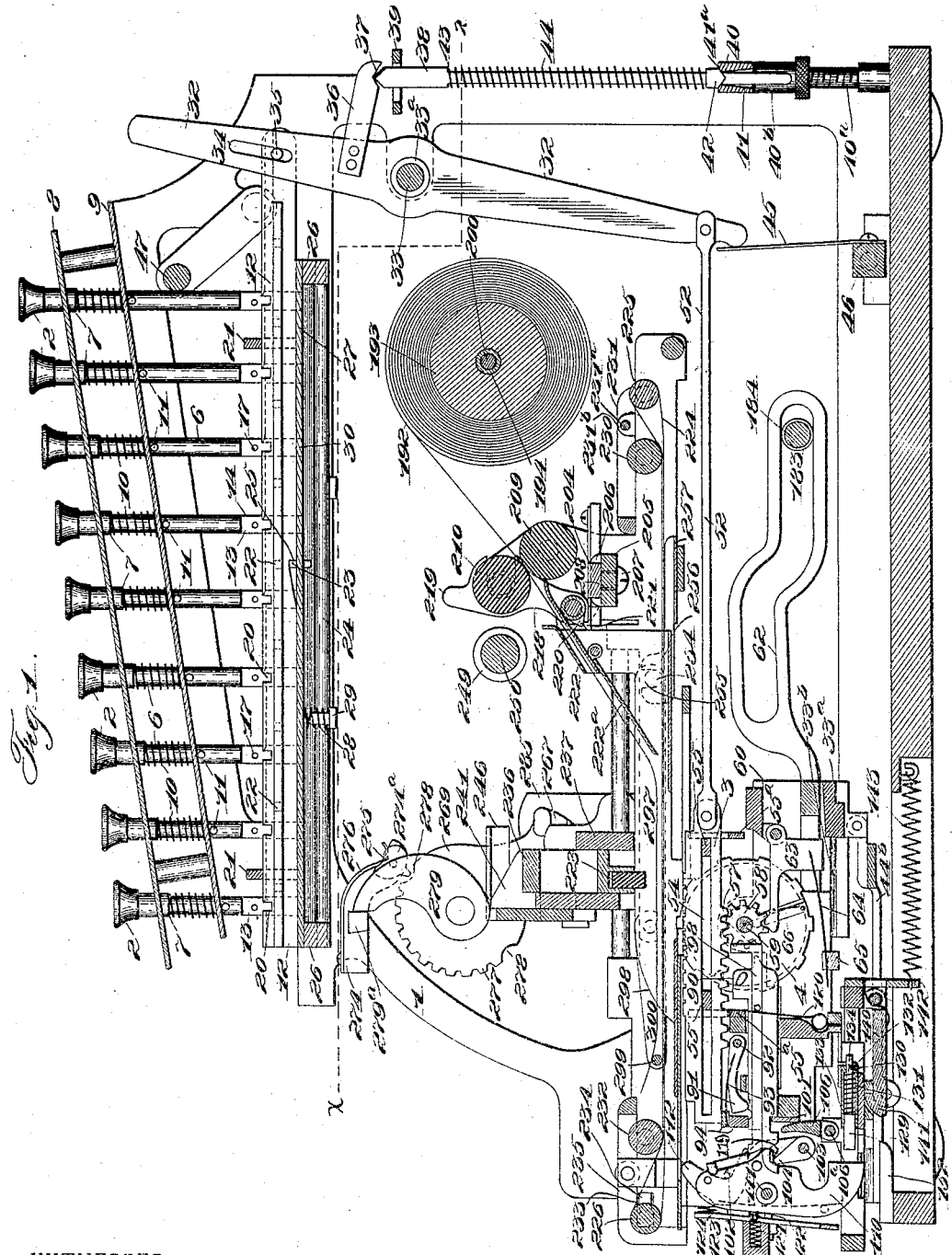
Figure 2:
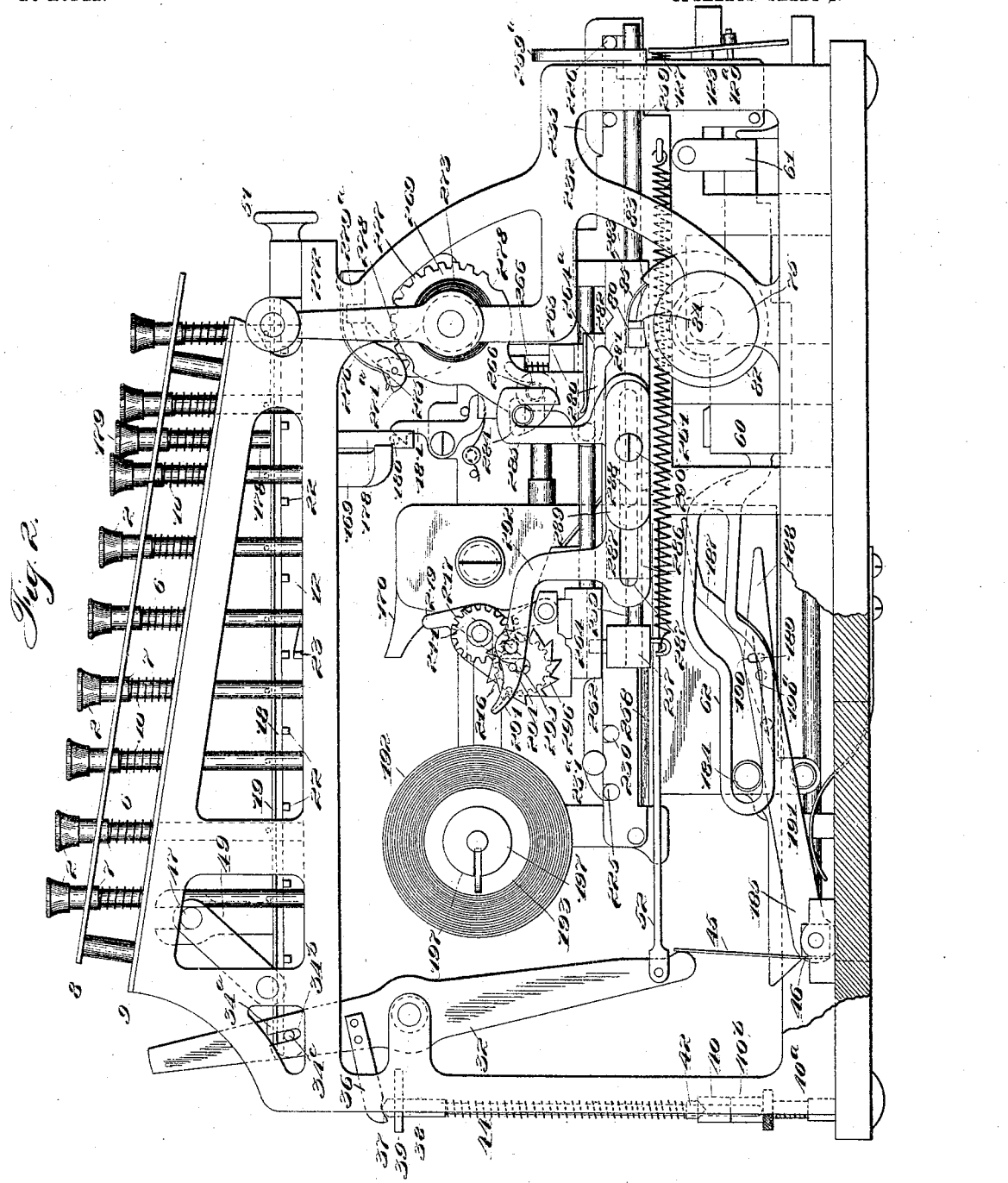
Figure 3:
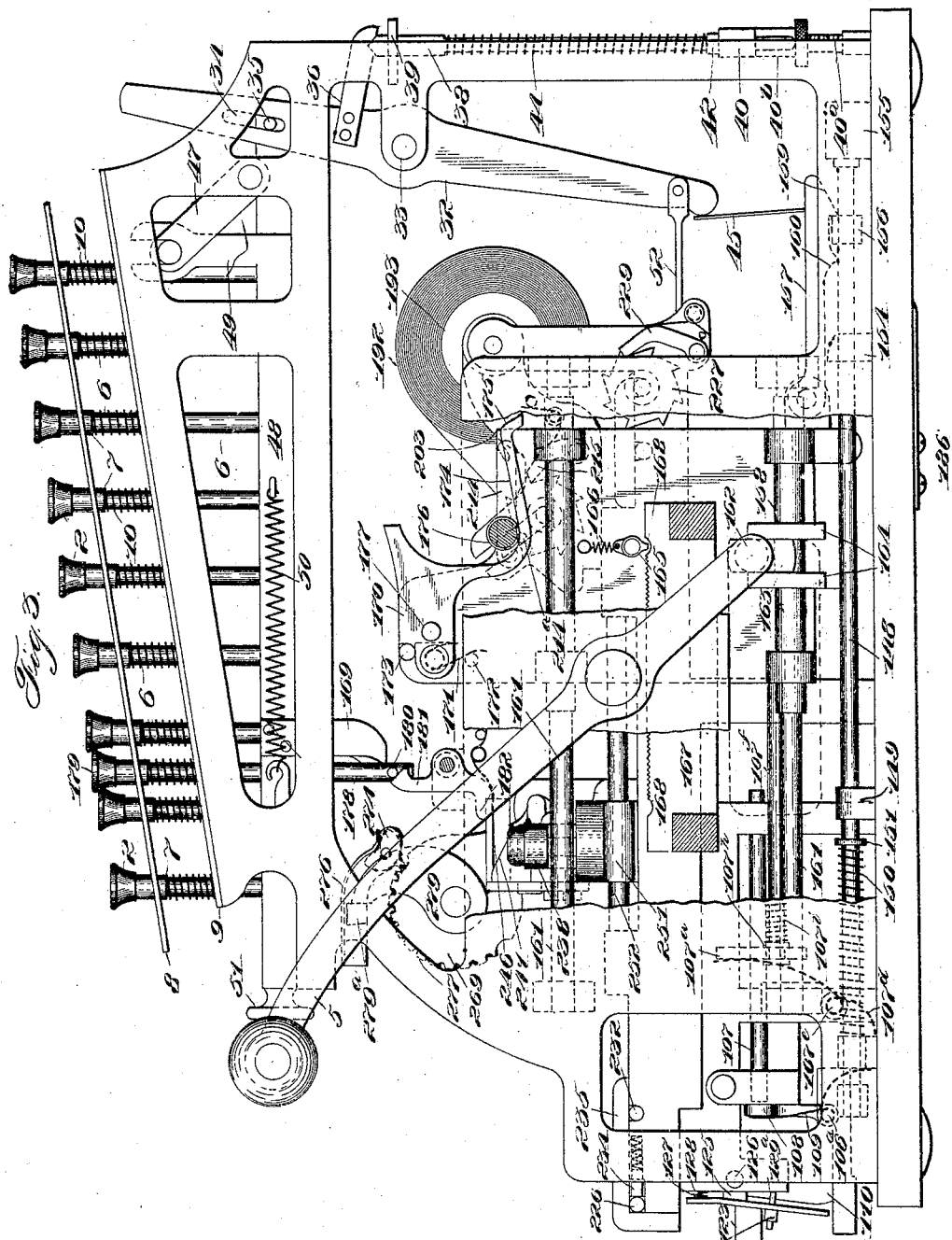

In the appended drawings, forming part of this specification, Figure 1 represents a central vertical longitudinal section through the devices embodying our invention. Fig. 2 represents an elevation, partly in section, of the left side of the machine. Fig. 3 represents a similar view of the opposite side of said machine, a portion of the frame being broken away to more clearly disclose the internal mechanism. Fig. 4 represents a rear elevation of our said improvements. Fig. 5 represents a front elevation of the same. Fig. 6 represents a top plan view of the machine with the key supporting and guiding plates removed. Fig. 7 represents a horizontal section through the machine on the line *x x* of Fig. 1. Figs. 8 and 9 represent, respectively, an enlarged detail perspective view of a key and a similar view of one of the key bars or slides. Fig. 10 represents a bottom plan view of the machine with the bottom plate and a number of the parts removed for clearness. Fig. 11 represents an enlarged detail perspective view, partly broken away, of the under side of the frame and plate for supporting the pivoted key-bar-locking plates, two of said plates being shown in position. Fig. 12 represents an enlarged detail perspective view of one of the totalizing type-wheels, its supporting-shaft, and the turn-to-zero mechanism, part of the latter being shown in section. Fig. 13 represents an enlarged detail perspective view of one of the printing-wheels, its connections, and two of the transfer-levers. Fig. 14 represents an enlarged detail central vertical longitudinal section through the paper-roll and mountings. Fig. 15 represents a detail perspective view of the operating disk and arm for the platen-carriage. Fig. 16 respresents an enlarged detail perspective view of the paper-elevating yoke and operating means therefor. Fig. 17 represents an enlarged detail front elevation of one of the finger-bars for guiding the type-bars. Fig. 18 represents an enlarged detail perspective view of the two left-hand transfer-bars and the latch-lever for the same. Fig. 19 represents an end elevation, partly in section, of one of the keys and its coöperating bar, the key being in its upper position; and Fig. 20 represents a similar view with the key in its depressed position.

In the aforesaid drawings, 1 represents the frame of the machine; 2, the keys; 3, the printing-bars; 4, the printing-wheels, and 5 the operating-handle.

The keys 2, as shown in Fig. 6, are arranged in nine banks or series of nine keys each and each series is numbered from one to nine, the first bank representing units, the second tens, the third hundreds, and so on up to the capacity of the machine, which is limited in the present instance to hundred millions, although it may be of any desired capacity. Each of these keys, as shown in Figs. 1 and 8, is provided with a shank or stem 6, formed with an annular shoulder 7 and loosely mounted in guiding-apertures formed in two inclined spaced plates 8 and 9, which are suitably mounted at the top of the main frame. Coil-springs 10 are located about the stems 6 and bear with their opposite ends against the shoulders 7 and the plate 9, whereby said stems are normally forced upward, said upward movement being limited by stop-pins 11, mounted on said stems and adapted to engage the under side of said plate 9. The stems of the respective lateral rows of keys are of different lengths, so that the lower ends of all of said stems will lie in the same horizontal plane. Each bank of the said key-stems coöperates with a key bar or slide 12, (see Fig. 9,) and as all of these bars and the devices to which they are respectively connected and operate are similar in construction and operation we will describe one only, and this description will suffice for all. The lower end of each of said stems is flat upon two sides, as at 13 and 14, and is formed with a lateral channel or groove 15. Each of said stems is further provided upon its flat side 13 with a laterally-projecting stop-pin 17. The said bar 12 is formed with a longitudinal groove 18, which by its location forms a horizontal retaining-flange 19 near the upper edge of the bar. This flange is slotted, as at 20, to permit of the pins 17 passing down through the same when the keys are depressed. (See Figs. 5, 8, and 9.) After a pin has passed down through one of these slots in the horizontal flange the bar is released and allowed to slide longitudinally, as hereinafter more fully described, and thus the flange will pass over the pin, as shown in Fig. 20, and hold the key in its depressed position against the tension of its spring until the bar is again returned to normal position. (See Figs. 5, 8, and 9.) This structure also prevents the consecutive operation of two or more keys in the same bank during a single operation of the machine, as the longitudinal movement of the bar 12 after a key has been depressed causes all of the slots 20 to pass out of alinement with the pins of the respective keys, and thus brings the flange 19 under the same to act as a stop. The said bar is guided and supported in position under its respective bank of keys by two transverse guide-bars 21, having suitable guiding-apertures through which said bar loosely passes. (See Figs. 1 and 5.) Said bar is also formed with a series of lateral stop projections 22, one for each key-stem, as shown in Fig. 9, said projections being different distances from their respective key-stems, according to the value of the key. The projection which coöperates with the single-unit key will of course be the closest to its respective key-stem, while that of the nine-units key will be the greatest distance from its key-stem. When the keys are in their normal positions, the projections 22 are in alinement with the grooves 15 and may pass through the same, so that the keys will not while in these positions interfere with the longitudinal movement of the key-bar. The said key-bar is held in its normal position with the slots 20 directly under the pins 17 by a nose 23, formed on one of a series of pivoted latch-plates 24 and engaging a shoulder 25, formed on the under side of said bar. This plate 24 is pivoted in a frame 26, so that its stop-nose 23 normally projects through a suitable aperture formed in a guide-plate 27, over which the key-bar operates and engages the aforesaid shoulder 25. Each of said plates 24 is held in its normal position by a coil-spring 28, which bears against the under side of the plate 27 and is mounted on a stud carried by an arm 29, fast to said plate. The said plate 27 is further provided with a series of apertures 30, (see Fig. 11,) located directly below the lower ends of the key-stems, so that when a key is depressed its stem will pass through one of said apertures and engage and force its respective plate 24 downward, and thus withdraw the nose 23 out of the path of the shoulder 25 and leave the key-bar free to move longitudinally until the projection 22, which coöperates with the operated key, contacts with the side 14 of said key-shank. The downward movement of each of the plates 24 is limited by stop-pins 31, mounted on the frame 26.

When one of the slides 12 is released, as above described, it is forced forward by one of a series of pivoted levers 32, mounted upon a transverse shaft 33, as shown in Figs. 1 and 4. This lever is formed above its pivot-point with an elongated slot 34, into which projects a pin 35, mounted on the said bar 12, whereby the lever and bar move together. The bar 12 is further guided and held in position by an arm 34ª, (see Figs. 2 and 4,) secured to the lever 32 and also formed with an elongated slot 34ᵇ, which receives a pin 34ᶜ, mounted on said bar. A laterally-projecting rigid arm 36 is also mounted on said lever above its pivot-point and is formed at its outer end with a shallow V-shaped notch 37, adapted to receive the sharp upper wedge-shape end of one of a series of plunger-rods 38. This rod is guided at its upper end by a transverse slotted plate 39, through which said rod projects, and at its lower end by a transverse bar 40, having downwardly-flaring apertures 41, one for each rod. The upper side of this bar 40 is formed with a shallow V-shaped groove 41ª, in which rest a number of sleeves 42, having sharp V-shaped ends, so that they may rock from side to side in said shallow groove. The aforesaid rod 38, which is formed near its upper end with a shoulder 43, projects through one of the sleeves 42, so that a coil-spring 44, surrounding said rod, will bear with its opposite ends against the sleeve 42 and the shoulder 43, and thus force the rod normally upward. It will be seen from the above that the rod 38 may rock in its guides, and thus follow the movements of the arm 36 and lever 32, which it is operating. The said bar 40 is formed near each end with vertical apertures, through which pass rigid vertical screw-threaded standards 40ª, upon which are mounted adjusting-nuts 40ᵇ. The bar 40 rests upon these nuts, and thus may be raised or lowered at will to increase or decrease the tension of the spring 44. It will also be seen from the above that the movement of the lever 32 under the impulse of the spring 44 is limited by the key-bar, which is in turn stopped according to the value of the key operated, as above described. The action of the spring 44 in starting the movement of the lever 32 and other devices connected thereto is assisted by one of a series of flat springs 45, which is mounted upon a rock-block 46 and bears against the lower end of said lever. This block is suitably pivoted on the base of the frame and is adapted to be rocked, as hereinafter more fully described, to cause said spring to bear against the lever or withdraw it from contact with the same. The said levers 32 are spaced upon the shaft 33 by sleeves 33ª, which are located between them on said shaft, and thus occupy nearly the entire width of the machine, and it is thus necessary to curve said levers below their pivot-point out of their vertical planes, so as to bring their lower ends close together (see Fig. 4) for the attachment of devices hereinafter more fully described.

A yoke 47 (see Figs. 1 and 4) is pivoted in the upper part of the main frame in proximity to the upper ends of the levers 32 and is adapted to contact with said levers to force any of the same that may have been operated back to normal position, and thus release the key or keys that have been operated. A sliding bar 48 is suitably mounted in the frame of the machine, as shown in Fig. 3, and is provided at its rear end with a vertical extension 49, the upper end of which is slotted to straddle the cross-bar of the yoke 47, and thus operate the same when said sliding bar is actuated. This bar is normally drawn forward by a coil-spring 50, which connects it with the main frame, and is operated by connection with the movable parts of the machine, so as to be reciprocated once during each operation of the machine, as hereinafter more fully described. The outer protruding end of the bar is provided with a button or knob 51, whereby it may be operated independently of the movements of the machine. This independent operation is necessary when an error has been made in operating a key and it is desired to release the key without operating the machine.

One of a series of link-rods 52 is pivotally connected to the lower end of each lever 32 and is in turn pivotally connected to one of a series of type-bars 3. Each of these type-bars is formed with an elongated slot 54, through which project two lateral supporting-bars 55, whereby said type-bar is held in the proper horizontal position, but at the same time is allowed to be moved longitudinally by the rod 52. These type-bars are further guided, spaced, and held in position against any lateral displacement by two finger-bars 55ª, (see Figs. 1 and 17,) so mounted on the main frame that their fingers project between said type-bars. Each of said type-bars is provided along its upper side with a series of spaced types for the printing-numerals from zero to nine and along its lower side with a series of rack-teeth 57. These type-bars are adapted to print a detail of each amount registered upon the machine and in addition are arranged to operate the totalizing type-wheels 4 through the medium of the rack-teeth 57. These rack-teeth are adapted to mesh with a series of pinions 58, which are fast to the respective type-wheels. Each of these type-wheels is provided upon its periphery with ten spaced types for printing numerals from zero to nine. These wheels are journaled upon a transverse shaft 59, which in turn is journaled in a frame 60, pivotally supported at its forward end by hangers 61, (see Fig. 2,) and provided at its rear end with an angular slotted arm 62, by means of which said frame is rocked, as hereinafter more fully described. When the frame is depressed, the pinions 58 are withdrawn from engagement with the rack-bars, and thus leave the type-wheels free to be turned by the transfer devices hereinafter described. A series of pivoted pawls 63 are mounted in the frame 60 and are normally forced forward into engagement with the respective pinions 58 by flat springs 64, mounted thereon and bearing against a cross-bar 65 of said pivoted frame. These pawls prevent any accidental displacement of the wheels 4 when the rack-teeth 57 are disengaged from the pinions 58 and also act as alining means for the types on said wheels to always hold them to the correct printing position. Each of said type-wheels is also provided with a shallow radial groove 66ª, (see Fig. 12,) in which is pivoted a pawl 66, said pawl being of less width than the groove and provided with a spring 66ᵇ, which normally tends to force it to one side of said groove. The inner end of the pawl 66 is beveled and normally rests against the periphery of said shaft 59. This shaft is formed with a longitudinal groove 67, having a radial wall and a tangential wall. When the shaft is rotated in a forward direction, the end of the pawl 66 enters the groove 67 and contacting with the radial wall is forced against the side of its groove, so that the wheel will locate with the shaft; but when the wheel is turned forward the bevel end of the pawl will contact with the tangential wall of the groove and said pawl will only be forced out of the groove against the tension of its spring without becoming fast to the shaft. The aforesaid shaft 59 is provided near one end (see Figs. 5 and 12) with a sleeve 68, fast thereto and formed with an annular groove 69, into which project the arms of a yoke-plate 71, which is mounted upon a bracket 72, secured to the frame 60. By this means all longitudinal movement of the said shaft is prevented without in any wise interfering with its rotary movements. The end of the shaft is square, at at 73, and is adapted to be turned by a short shaft 74, which is formed in its end with a square recess for the reception of said square end. This shaft 74 is provided upon its outer end with a milled thumb nut or knob 75, whereby it is turned and is supported in position in proximity to the shaft 59 by a journal-sleeve 76, mounted upon the main frame. A coil-spring 77 is mounted upon said shaft 74, within said sleeve and bears with its opposite ends against a shoulder 78, formed on said shaft and a stationary cam-disk 82, mounted at the inner end of the sleeve, said shaft passing through the center of said disk. The tendency of this spring 77 is to normally force the shaft 74 outward away from the shaft 59. When said shaft 74 is in its normal position, a radial arm 80, mounted thereon near its inner end, is seated in a radial groove 81, formed in the cam-disk 82, and thus prevents the rotation of said shaft as long as it remains in this normal position. The said cam-disk 82 is formed with two shoulders 83 and 84, while the arm 80 is provided with an angular spring-plate 85. When in normal position, the plate 85 rests against the shoulder 83, and thus prevents any backward rotation of the shaft 74. After the initial movement of the shaft 74 the plate 85 snaps over the shoulder 84, and thus prevents the shaft being returned to its normal position except by a forward movement.

It will be observed from the above that after the shaft 74 has been forced forward to engage the shaft 59 and disengage the arm 80 from groove 81 and then slightly turned it cannot be disengaged from said shaft 59 until it has made a complete revolution, as it cannot be turned backward after its initial movement, and will not disengage from the shaft 59 until the arm 80 has again become seated in the groove 81, which only occurs when said shaft has returned to normal position. As the shaft 59 is carried by the rocking frame 60, it is only in alinement with the shaft 74 when said frame is in a middle or intermediate position, and it therefore becomes necessary to provide means for arresting said frame at the proper point when it is desired to couple the shafts and turn the type-wheels to zero. These arresting devices are hereinafter described in connection with the operating means with which they intimately coöperate.

The transfer devices between the respective printing-wheels may be grouped into two classes, the first being the transfer devices, which are positively operated by said wheels when they receive motion from the rack-bars, as heretofore described, and the other being the devices which effect a transfer, which is necessary because of a previous transfer and which must be accomplished independently of the operating rack-bars.

The first-mentioned transfer devices may be described as follows: Each of the aforesaid printing-wheels is provided on one side with a mutilated disk 86 (see Fig. 13) and also with a stud or projection 87. The transfer from one of said type-wheels to the next higher denomination is effected upon the descent of the frame 60 by a series of slidable transfer-bars 88, mounted in suitable guide-bars of the main frame. (See Figs. 1, 13, and 18.) Each of these bars is provided at one end with an operating-nose 89, adapted to coöperate with one of the pinions 58, and also with an incline or cam-lug 90, which is in turn adapted to be struck by the projection 87 of its respective type-wheel to draw the bar 88 rearward. Each of said projections 87 is so located with respect to the types of its respective wheels as to engage and move its lug 90 after the wheel has made a complete revolution and as the zero-type is moved to printing position. It will be observed by reference to Fig. 18 of the drawings that while the stud 87 of one wheel operates the lug 90 of its respective bar 88 the nose 89 of this bar projects into a plane to coöperate with the pinion 58 of the adjoining or next higher type-wheel. Thus when one wheel has made a complete revolution it moves rearward the transfer-bar for the adjoining wheel. This rearward movement of a transfer-bar takes place of course when the carriage or frame 60 is in its upper position, so that as said frame descends the nose 89 of the operated bar will engage its respective pinion 58, and thus rotate the wheel carrying said pinion a distance sufficient to bring the next highest type thereon to printing position. In order to hold said transfer-bars 88 against accidental displacement from the positions to which they are moved, we provide a series of pivoted pawls 91, mounted upon a cross-bar 92 of the main frame and normally forced downward by a series of bow-springs 93, fast to the respective pawls and having their outer ends secured under a cross-bar 94 of said main frame. (See Figs. 1 and 13.) The operating ends of the said pawls 91 rest upon the tops of said transfer-bars and coöperate with notches 95 and 96, formed therein, to hold the said bars in their inner and outer positions against accidental displacement. Each of said bars is further formed with a longitudinal groove 97 (see Fig. 18) for the reception of a latch-bar 98, hereinafter described, and also at one end upon its under side with two notches or recesses 99 and 100. A cross-bar 101, (see Fig. 1,) mounted on the main frame, extends transversely through all of the recesses 99, and thereby limits the movement of said transfer-bars. A series of independent pivoted locking-levers 102 are mounted upon a cross-bar 103 of the main frame. Each of these levers is formed with a shoulder 104, which is of a width double that of the lever, so as to extend to one side of the same. The said laterally-extending portion of the shoulder projects into the notch 100 of its respective transfer-bar, so as to be capable of operating the bar to return it to normal position and also of being operated by the bar to throw the lever rearward, as hereinafter described. The last lever 102 is formed with an extra-wide shoulder, which projects to both sides of the same, so as to coöperate with both of the two last transfer-bars, as shown in Fig. 18. This formation is necessary, because of the fact that while there are eight transfer-bars there are only seven levers 102. After the levers 102 have been drawn rearward by the rearward movements of their respective transfer-bars they are returned to their normal positions by a transverse rock-plate 106, pivoted on a shaft $106^a$, which is mounted in the main frame (see Fig. 1) and arranged to be operated upon each operation of the machine by a sliding bar 107. This bar is suitably mounted in the main frame (see Fig. 3) and is arranged to contact at its forward end with an ear 108, formed on the rock-plate 106, and normally forced rearward by a spring 109, which is wound about the pivot-shaft $106^a$ of plate 106 and bears with its opposite ends one against the main frame and the other against the ear 108. The bar 107 is actuated upon each operation of the machine by means of an ear or plate $107^a$, secured fast to it and formed with a vertical groove $107^b$ and a notch $107^c$. (See Figs. 5 and 7.) The said groove receives the end of a spring $107^d$, which is mounted upon a stud $107^e$, so that the plate $107^a$ is normally forced rearward. The notch $107^c$ is adapted to receive a headed rod $107^f$, which is loosely mounted in an aperture formed in the main operating-carriage 158, hereinafter more fully described. The head of the rod $107^f$ lies upon one side of said plate $107^a$, while a nut $107^h$ is mounted upon said rod upon the opposite side of the plate. A coil-spring $107^i$ surrounds the rod and bears with one end against the nut $107^h$. When the carriage 158 is moved forward, as hereinafter more fully described, it will pass along the rod $107^f$ until the front of the carriage compresses the spring $107^i$. This action will cause the plate $107^a$ to move forward, and thus operate the rod 107 and throw the latch-levers 102 forward. This forward movement of the levers 102 will cause the shoulder 104 to return any transfer-slides that have been forced rearward.

The above description relates to the devices for accomplishing the first or original transfer, and we will now pass on to the description of the devices for effecting the auxiliary or double transfer or transfer following a transfer—such, for example, as when the last two wheels—namely, the units-wheel and the tens-wheel—stand at "99" and one unit is to be added, thereby necessitating a transfer from the units-wheel to the tens-wheel and also a transfer from the tens to the hundreds wheel. A series of transfer-levers 110 are pivoted upon a transverse shaft 111, mounted in the main frame, and are each provided with a pivoted stop-pawl 112. The office of these levers is to set the transfer-bars independently of the movements of their respective type-wheels when a transfer is made necessary by a transfer. The pawls 112 are mounted upon their respective levers near the upper ends of the same and are limited in their movements by stop-pins 113, also mounted on said levers. (See Fig. 13.) Springs 115 have their upper ends secured in the metal of the respective pawls in any suitable manner and bear with their free ends against stop-pins 116, also mounted on said levers, so that the pawls are normally forced forward into contact with the pins 113 and with their operating ends projecting from the sides of said levers. These projecting ends of the pawls are arranged to normally rest upon the inner upturned ends of the latch-bars 98, and thus prevent the rocking of the levers upon their fulcrums. Each of the levers 110 is further provided upon each side with an operating pin or stud 117, said pins being arranged to coöperate with the inner beveled ends 118 of the bars 88, located upon the opposite sides of the same, so that when the bars are returned to normal position, as above described, they will effect the initial return movement of the levers 110, if the same have been operated, so that the shoulders 104 of the levers 102 may pass under the shoulders 119 of the levers 110, as hereinafter described. The last part of the return movement of the levers 110 is effected by the upper portions of the levers 102 striking the same and studs 105 on said levers striking the pawls 112, which latter action causes the pawls to positively return to their normal positions above their respective latch-bars. The above operation takes place, of course, only if the levers 110 have been operated to effect a transfer which was caused by a transfer. If a single transfer only has been accomplished, then the lever 102 that has been operated is returned. Each of the latching-bars 98 is normally held in the path of the projecting portion of its respective pawl 112 by its cam-disk 86, mounted on its respective type-wheel and engaging an an arm $119^a$, formed on said bar, (see Fig. 13,) so that the lever 110 is thereby locked against operation. When a type-wheel reaches a point where the "9" type stands in printing position, the flat side of its cam-disk 86 permits its respective latching-bar 98 to pass forward under the impulse of a spring 120, which connects it with the main frame, (see Fig. 1,) and thus withdraws the rear end of said bar out of the path of its respective pawl 112, which leaves the lever carrying the pawl free as far as the latch-bar is concerned; but in addition to these latch-bars each lever 110 is locked in normal position by the shoulder 104 of its lever 102, said shoulder projecting under a shoulder 119, formed on the lever 110. As before stated, each of the aforesaid levers 102 is provided at its upper end with a laterally-projecting stud 105. In each case this stud 105 projects into alinement with the pawl 112 of one of the levers 110, while the shoulder 104 of the lever carrying said stud projects under the shoulder 119 of the adjoining lever 110.

It will be seen from the above that each of the transfer-levers 110 is double-latched in normal position and cannot be operated until both of said latches are sprung. The first of these latches, the levers 102, are, as before described, operated by the transfer-bars and also by the movements of the levers 110, as hereinafter described. The second of the latches for the bars 97 are released by the cams 86 upon the type-wheels. If three of the type-wheels—for example, the units, tens, and hundreds wheels—stood at "999" and one were added to the first or units wheel, this would necessitate two transfers, or rather a transfer following a transfer. As the type-wheels stand at "9" the latch-bars 97 are of course out of operative position, and the levers 110 are simply latched against operation by the levers 102. Now upon the movement of the units-wheel by its rack-bar its transfer-bar 88 is drawn rearward, which operation rocks its lever 102. This movement of the lever 102 completely unlocks the adjoining lever 110 of the tens-wheel by moving the shoulder 104 from under the shoulder 119. Now when the said lever 110 of the tens-wheel is operated to have its upper portion forced rearward, as hereinafter described, its pawl 112 engages and forces rearward the stud 105, resting against the same, and thereby operates the next succeeding or hundreds-wheel lever 102, carrying said stud, so as to move the shoulder 104 of the lever from under the shoulder 119 of the adjoining or hundreds-wheel lever 110, and since said hundreds-wheel stands at "9" this lever 110 for the hundreds-wheel is now completely unlocked in the same way in which the tens-wheel has been described to be unlocked, so that upon the operation of this hundreds-wheel lever 110 by the operating mechanism in the manner to be described the same sequence of movements will take place between the hundreds-wheel and the thousands-wheel that has just been described between the tens-wheel and the hundreds-wheel. The rearward movements of the levers 110 cause the pins 117 to engage the bevel ends of the transfer-bars, and thus force them rearward to operative position, the only levers 110 which are thus operated being the ones which had been wholly unlocked, as above described. The movements of the levers 110 are produced by the operating mechanism and in proper succession, as later to be described, and of course occur before the frame 60 moves downward, so that when said frame is moved downward a transfer will occur upon each wheel for which the respective transfer-bar 88 has been moved rearward. The stud 105 is omitted from the first lever 102 of the series, as there is no pawl 112 to the right of the said lever 102 to coöperate with said stud.

As the withdrawal of the end of one of the latch-bars 98 from the path of its respective pawl 112 only continues during the time its type-wheels stands at "9," it becomes necessary to provide means for preventing the pawl 112 again engaging the latch-bar when it resumes its normal position. This we accomplish by providing coil-springs 121, which surround studs 122 on the respective levers 110 and are supported in position, so as to exert pressure upon said levers by a recessed bar 123, into which they project. (See Fig. 1.) This bar is mounted upon a frame 124, which latter is pivotally supported in position by apertured trunnion-ears 125, formed at opposite sides of its upper portion and which receive trunnion-screws 126, mounted in the main frame. (See Fig. 3.) The frame 124 is normally forced backward at its upper end by coil-springs 127, which are mounted in suitable sockets in the main frame and surround pins 128, mounted on said frame 124. The inward movement of the lower end of this frame is limited by set-screws $129^a$, mounted thereon and arranged to contact with the main frame. The lower end of this frame 124 acts as a stop for the levers 110 in the following manner: When one of the latch-bars 98 is drawn rearward and out of the path of its pawl 112, the lever 110, carrying said pawl, is thrown slightly rearward by its spring 121 and is stopped by the lower end of said lever contacting with the lower portion of said frame 124. This movement naturally depresses the projecting nose of the pawl 112, so that when the latch-bar is moved back to its original position it does not pass under the pawl, but contacts with the front of the same and forces it back slightly against the tension of its spring. It will further be observed that as the frame 124 normally acts as a stop for the levers 110 when the latter are moved a very slight distance by their springs 121, as above described, it will assist in returning said levers to their normal positions when they are fully operated, as such full operation will move the frame and compress the springs 127. As one of said levers 110 upon being operated releases the next higher lever in an operation of transfer such as just described, it becomes necessary to provide means for operating said levers consecutively. This we effect by providing a series of graduated plungers 129 and mounting the same in a sliding bar 130. (See Figs.

1 and 10.) This bar is formed with a plurality of spaced passages 131, having shoulders 132 formed at their inner ends. The plungers 129, which are mounted in these passages, are also formed with shoulders 133, and coil-springs 134 surround said plungers and bear with their opposite ends against the respective shoulders 132 and 133, so as to normally tend to force the plungers forward out of the passages, said forward movement being limited by stop-pins 135, passed through the respective plungers beyond the bar 130. As before mentioned, the said plungers 129 are of different lengths, decreasing from the right to the left, so that when the bar 130 is forced forward the levers 110 will receive pressure successively from right to left and will be operated when they are released, as above described. Only such levers 100 as have been released from the shoulders 104 and the latch-bars will be operated by the said plungers, and those which have not been released will simply act as stops for their respective plungers, which latter will be forced back in their respective recesses against the tension of their springs as the bar 130 advances. This bar is secured at its opposite ends to sliding rods 136, (see Fig. 10,) which are mounted in apertured lugs 137 of the main frame and are connected at their rear ends by a cross-bar 138. This bar is provided near its middle with two spaced lugs 139, between which is pivoted a spring-pressed latch-lever 140, having a bevel-faced hook end 141, as shown in Fig. 1. The said bar 138 is further provided with an apertured lug 142, to which is secured one end of a coil-spring 143, the opposite end of said spring being secured to a portion of the main frame, so as to exert a tension to normally retract the bar 138. The end 141 of said latch-lever is arranged to coöperate with a sliding bar 144, having an aperture 145, formed with a bevel-wall 146 and into which said hook end is arranged to enter. One side of the bar 144 projects into a groove 147, (see Figs. 5 and 10,) formed in a portion of the frame, while the opposite side of said bar is rigidly attached to a sliding rod 148, mounted in apertured lugs 149 of the main frame. This rod 148 is normally held in a retracted position by a coil-spring 150, which surrounds the same and bears with its opposite ends against one of the lugs 149 and a collar 151, fast to said rod. When the said rod 148 is forced forward, as hereinafter described, it carries the bar 144 with it, and this bar engaging the hook 141 of the lever 140 carries the bar 138 forward also, which action results in a forward movement of the plungers 129, as before described.

As it is absolutely necessary that the plungers 129 be fully operated and returned to their normal positions during the initial movement of the machine and before the frame 60 has been depressed, the hook 141 must be disengaged from the bar 144 after the last plunger has contacted with and exerted a pressure upon its lever 110. To accomplish this result, we provide a rigid bevel-lug 152 at the forward part of the main frame, as shown in Fig. 1, and arrange the same so that it will engage the protruding bevel end 141 of the lever 140 upon the forward movement of said lever, and thus force the lever down against the tension of its spring until its hook end is free of the wall of the aperture 145. The spring 143 will now draw the bar 138 and devices connected thereto back to their original positions, while the bar 144 will continue its movement until it is in turn released and snaps back to its original position under the impulse of its retracting-spring 150. As the bar 144 moves back to normal position the end 141 of the lever 140 again enters the aperture 145, and the parts are again ready for operation. The said bar 148 is guided at its rear end by an apertured lug 154, mounted on the main frame, and is adapted to abut at the end of its rapid rearward movement against a flexible buffer 155, mounted on the main frame. A block or collar 156 is mounted fast on said rod 148 near its rear end and is adapted to be engaged by a pivoted spring-pressed hook 157, (see Fig. 3,) which is mounted on the main operating carriage or slide 158. This hook is formed with a bevel end 159 and a bevel projection 160, so that when the carriage 158 moves rearward the bevel end 159 will contact with the collar 156, so that the hook will ride over and catch upon said collar. The forward movement of the operating-carriage will now cause the hook 157 to draw the rod 148 forward until the bevel projection 160 contacts with the bevel top of the lug 154, which will raise the hook and permit the rod 148 to return to normal position, as before described, while the operating-carriage continues its forward movement. The said bar 144 is further provided with two apertured lugs 44$^a$, to which are pivoted the respective arms of a yoke 44$^b$. This yoke is provided at its center with a lug 44$^c$, which is also pivoted between lugs 44$^d$, mounted on a slide 33$^a$. This slide is mounted in guides 33$^b$ on the frame 60, so that it will move with the yoke 44$^b$ when the latter is actuated by the movements of the bar 144. (See Fig. 10.) The upper surface of said slide 33$^a$ is slightly inclined, so that when said slide is moved forward this inclined surface will engage the under sides of the pawls 63, and thus force said pawls positively upward to cause them to bring the printing-wheels into true printing alinement, as better shown in Fig. 1. The carriage 158 has practically the form of a yoke, as best seen in Fig. 5, and the two arm of said yoke are movably supported in position by longitudinal guide-bars 161, secured at their opposite ends to the main frame. The carriage receives motion from the operating lever or handle 5, which is pivoted upon the main frame and is provided at its lower end with a laterally-projecting stud 162, upon which is pivotally mounted a block 163. (See Fig. 3.) This block projects between two spaced lugs 164, mounted on the lower part of said carriage, so that as said lever is oscillated the carriage will follow its movements without any binding action, as the block 163 is free to move up and down between the lugs 164. In order to compel a complete movement of the carriage at each operation of the machine, we provide the same with a pivoted pawl 165, which is normally held in a vertical position by a coil-spring 166, which connects it to said carriage. This pawl is arranged to coöperate with a stationary rack-bar 167, mounted on the main frame and so located that the said pawl 165 must assume an inclined position in order to engage the rack-teeth of the same. Recesses 168 are formed in the bar 167 near each end, so that when the pawl reaches these points it may assume a vertical position, and thus be capable of being reversed, so as to move in an opposite direction over the rack-bar upon the return stroke.

As before stated, the sliding bar 48 for returning the levers 32 to normal position is connected to the movable parts of the machine, so as to be operated upon each operation of the machine. This is accomplished by means of a pendent arm 169, fast to said bar and arranged to be struck by a pivoted pawl 170, (see Fig. 3,) mounted on a vertical extension of the carriage 158. This pawl is normally held in its upper position to engage said arm by a spring 171, connected thereto and bearing against a pin 172, mounted on said carriage, said upward movement being limited by a pin 173, also mounted on said carriage. The pawl is further provided with a curved extension or arm 174, having a beveled end 175 and arranged to be operated by contacting with an antifriction-sleeve 176, journaled on the main frame. When the carriage 158 moves forward, the pawl 170 is depressed against the tension of its spring by striking the lower end of the arm 169, and thus passes under said arm and springs up upon the opposite side of the same. Now when the movement of the carriage 158 is reversed the vertical wall of the pawl 170 will engage the arm 169 and force the same forward until the bevel end 175 of the arm 174 strikes the sleeve 176, when the pawl will be forced down, so as to release the arm 169 and allow the bar 48 to assume its normal position under the impulse of its spring 50. Said pawl 170 further carries a stud 177, which is adapted to abut against the stem 178 of a special locking-key 179 when said key is depressed, and thus arrest the movement of the machine. This special key is mounted in the plates 8 and 9 in a similar manner to the regular keys and is provided near its lower end with a laterally-projecting pin 180, which is arranged to coöperate with a pivoted spring-pressed latch 181, mounted on the main frame. When said special key is depressed, this latch catches the pin 180, and thus holds the key in its depressed position in the path of the stud 177. If the machine is now operated, the stud will contact with the stem of the special key after the machine has made a partial movement, and thus bring the machine to rest at its intermediate position. When the parts are in this position, the frame 60 has been moved just far enough to bring the shaft 59 into alinement with the socket formed in the shaft 74, so that the latter may be moved forward to couple the shafts and turn the type-wheels to zero, as before described. The aforesaid latch 181 is provided with an arm or extension 182, whereby it may be tipped against the tension of its spring to disengage it from the pin on the key-stem, and thus allow the special key to assume its normal position, this latch 181 being situated within the casing of the machine and of course accessible only to the person having authorized access to the interior of the machine.

As before stated, the frame 60 is rocked on its pivots by an angular slotted arm 62, (see Figs. 1 and 10,) and this arm in turn receives motion from an antifriction-sleeve 183, which projects into the slot of said arm and is mounted upon a rigid arm 184, secured to the carriage 158, so as to move with the same. It will be observed by reference to Fig. 1 that the slot in the arm 62 is horizontal for the greater part of its length, with an inclined portion near its middle. This peculiar structure of the arm 62 causes it to be depressed only after the first quarter of the movement of the machine has been made, which allows full time for the setting of the transfer-bars, as before described, before the frame 60 is depressed by said arm to accomplish the transfer.

As the principal operation of the type-bars and type-wheels does not take place during the operation of the lever 5, but upon the depression of the keys 2, it becomes necessary to provide sufficient spring force to accomplish these movements, which force, as before described, is derived from springs 44 and 45. Said latter springs are simply intended to assist in the initial movement of the levers 32, which they engage, and are adapted to relax their tension when the said levers are being returned to normal positions by the yoke 47, as before described. This relaxing of the springs is accomplished by the rocking of the pivoted block 46, upon which said springs are mounted. The devices for accomplishing this result are more clearly shown in Figs. 2 and 10 and comprise a lever 185, fast to one end of the block 46, and a spring 186, fast to the base or frame and engaging said lever to normally force the same upward, so that the springs 45 will engage the levers 32 under tension. This lever 185 is formed near its forward end with an inclined portion 187, which is engaged by the arm 184 when the carriage 158 is moved forward, and thus depresses said lever and rocks the block 46 backward. As this movement of said block is not sufficient to fully remove the springs 45 from the paths of the levers 32, the said block must be further rocked, and to accomplish this result we provide the side of the lever 185 with a pivoted frog 188, which in turn is provided with a stop-pin 189, projecting into a short slot 190, formed in said lever. The pin is normally held in the lower end of the slot by a spring 190$^a$, mounted on the lever 185 and engaging the protruding end of said pin. As the said carriage 158 passes forward an antifriction-roller 191, mounted thereon, passes under the frog 188, so as to engage the under side of the same forward of its pivot, and thus force said forward end of the frog upward against the tension of the spring 190$^a$. When said roller 191 passes free of the forward end of the frog, the latter will assume its normal position, whereby upon the return of the carriage the roller 191 will engage the incline top of the frog and force the same, together with the lever 185, downward. This latter movement of the lever retracts the springs 45 to such a degree that the levers 32 may be returned to normal position without putting the said springs under tension. As the carriage continues its rearward movement the roller 191 passes to the rear of the pivot-point of the frog, and thus again rocks said frog on its fulcrum, so that when it passes free from the rear end of said frog the latter will again return to its original position ready for the next operation. After said roller has passed to the rear of the frog-fulcrum on the back stroke the lever 185 under the action of the spring 186 gradually assumes its normal position as the roller passes along the frog, and thus causes the springs 45 to again engage the levers 32 under tension, so as to be ready for the next operation of the machine.

We have now described the devices for moving the type-bars, type-wheels, and coöperating mechanism, and we will therefore now pass on to a description of the devices for feeding the paper strip forward and depressing the same into contact with the type-bars and type-wheels to print the details and totals registered thereon, as the case may be. The said paper strip 192 is mounted upon a spool 193, which in turn is mounted upon a hollow shaft 194, provided at one end with a grooved wheel 195 (see Figs. 7 and 14) and formed at the opposite end with an annular groove 196. The said spool is held on the said shaft 194 under spring tension by a detachable nut 197, which is apertured to slip over said shaft and is provided with a spring-pressed pawl 198, which is adapted to enter the groove 196, and thus hold the nut in position on the shaft. A coil-spring 199 is mounted in the end of the nut 197, so that when said nut is applied in position on the shaft said spring will be compressed against the end of the spool, and thus create a tension to prevent accidental turning of said spool. When it is desired to place a new spool of paper upon the shaft, the nut is simply removed by disengaging its pawl from the annular groove in the shaft. This shaft is journaled upon a rod 200, which is fixed to a standard 201, mounted on the main frame, and is adapted to be moved laterally on said rod by the arms of a yoke 202, which project into the groove of the wheel 195. This yoke is formed on the end of an arm 203, which is mounted on a laterally-movable carriage or slide 204. Said yoke 202 is formed with a suitable socket, in which is mounted a coil-spring 202$^a$, the outer end of which bears against a tension-plate 202$^b$, also projecting into the groove of the wheel 195. Said plate 202$^b$ is formed with an ear 202$^c$, which is pivotally mounted upon the arm 203. Said carriage 204 rests upon a cross-bar 205 of the main frame and is held against lateral displacement by lugs 206, formed on said bar, and prevented from rising off its seat by headed bolts 207, which extend through slots 208, formed in said bar, and engage said carriage. This carriage carries paper-feeding rollers 209 and 210 and is only moved laterally when the sum-total of a series of numbers is to be printed. This lateral movement of the carriage and the paper strip carried thereby is necessary, because the type-bars print out of alinement with the type-wheels, as they are located between the same, and it is therefore necessary to move the paper, with the several numbers printed thereon, to the left, so as to bring the columns of figures directly in line with the printing positions of said type-wheels. The roller 209, which is covered with some flexible material, such as rubber, is journaled in slots 211, formed in standards 212, mounted at each side of the carriage 204. One of the journal ends of said roller is provided with a ratchet-wheel 213, (see Fig. 7,) and this wheel is arranged to be moved one tooth at each operation of the machine by a spring-pressed pawl-arm 214, pivotally mounted on the carriage 158 and adapted to ride over the ratchet-wheel on the rearward stroke, but engage and move it on the forward stroke. Said pawl-arm normally rests upon a stop-pin 214$^a$ and is thus held in the proper position to engage the wheel 213. Said ratchet-wheel 213 is also engaged by a spring-pressed locking-pawl 215, mounted on the carriage 204, and is thus guarded against accidental movement or backward rotation. The end of the roller 210 opposite from the wheel 213 is provided with a gear-wheel 216, which normally meshes with a similar gear-wheel 217, mounted on the end of the roller 210. This latter roller is also journaled in the slots 211 and is held to engagement with the roller 209 by a pivoted yoke 218, mounted on the carriage 204 and formed with slotted arms which embrace the journal ends of said shaft, a nose 219 being formed on the end of one of said arms. Said yoke is held in its normal position by a lip 220, formed on the same and resting normally upon the top of a spring-latch 221, secured to the carriage 204, as seen in Fig. 1. When it is desired to disengage the two rollers 209 and 210, the nose 219 is drawn rearward, which rocks the yoke 218, causing the lip 220 to depress the latch 221 until it snaps back of the shoulder of said latch. The rocking of the yoke 218 will cause the walls of the slotted arms to raise the upper roller 210 away from the lower roller 209, and thus permit of the paper being adjusted between said rollers. The rollers will now remain separated until the nose 219 is again forced forward and the latch 221 allowed to assume its normal position. After the paper strip 192 is fed between the rollers 209 and 210 it passes into a guiding-chute 222 and is led downward over a hinged spring-pressed guide-plate 222ª and thence forward under the platen 223 and out of the machine. An endless inking-ribbon 224 is located below the paper strip and is supported by rollers 225 and 226, about which it passes. The roller 225 is journaled in suitable notches formed in the top of the main frame and is provided at one end with a ratchet-wheel 227. (See Figs. 3 and 7.) This wheel is arranged to be moved upon each operation of the machine by a spring-pressed pawl 228, similar to the pawl 214 and also mounted upon the carriage 158. Said wheel is further engaged by a pivoted spring-pressed locking-pawl 229, similar to the pawl 215, but mounted upon the main frame. By this means the ribbon is fed forward at each operation of the machine and a fresh impression thus always assured. A guiding-roller 230, under which the ribbon passes, is also journaled in suitable notches formed in the main frame in proximity to the roller 225, and both of said rollers are held removably in position in their respective notches by a frame 231, which extends over the upper ends of said notches and is removably secured in position on the main frame by a screw-rod 231ª, which passes through said frame and apertured lugs 231ᵇ, formed on the main frame. This roller 230 and a similar roller 232, mounted in proximity to the roller 226, are arranged to act as guides for the ribbon 224 to cause the same to lie in the proper proximity to the printing-types. As the said inking-ribbon will become loosened or stretched by wear, we mount the journal ends of the roller 226 in elongated slots or notches 233, formed in the main frame, and provide spring-pressed plungers 234, also mounted in the main frame, so as to engage and force the journal ends of said roller forward. The journals of this roller as well as the roller 232 are held in their respective notches by an angular frame 235, which is removably mounted on the main frame in a similar manner to the frame 231. The aforesaid platen 223 is of a suitable flexible material and is mounted in a platen-bar 236, which in turn is mounted in a carriage 237, so as to be capable of sliding vertically therein. The upper portion of said platen-bar 236 is formed with two laterally-projecting apertured ears 238, (see Fig. 5,) through which project guiding-pins 239, mounted on said carriage 237. Said pins 239 are provided with coil-springs 240, which bear with their respective ends against the said carriage 237 and the ears 238, so as to normally hold the platen-bar and platen in its upper position. A beveled lug 241 (see Fig. 1) is mounted upon the upper portion of the platen-bar and projects at its forward end into a slot 242, formed in the front of the carriage. This lug 241 is provided with an antifriction-roller 243, which projects into an elongated slot 244, formed in a lever 245, which is pivoted upon the said carriage 237. This lever is provided with an operating-arm 246 (see Fig. 7) and is formed with a slot 247, through which projects a headed screw 248, mounted on the carriage 237. It will be seen from the above that this screw limits the movements of the lever 245 and that this lever in turn limits the movements of the platen-bar. When the platen-carriage 237 is in its normal position, as shown in Fig. 1, it is adapted to be depressed to print from the type-bars at each operation of the machine by an antifriction-roller 249, mounted on the outer end of an arm 250, which in turn is rigidly mounted upon the main carriage 158, so as to be reciprocated therewith. This roller 249 is so located as to engage the bevel-lug 241 upon the forward movement of the main carriage, and thus depress the platen-bar, carrying said lug against the tension of its springs, and force the paper strip down so as to print from the type-bars. It will be seen by reference to the drawings that the printing positions of the type-bars and the type-wheels are different and that when it is desired to print the total from the type-wheels the platen-carriage must be moved forward to a position directly over the same. Said platen-carriage must therefore be movable, and to accomplish this result I form said carriage with two apertured lugs 251, (see Fig. 3,) through which pass guiding and supporting rods 252, mounted on the main frame. The carriage is further provided with two rearwardly-extending bars 253, each of which is provided with a laterally-projecting stud 254. These studs project into notches 255, formed in bars 256, which latter are fast to a slide 257. One end of this slide is mounted in a groove 258, (see Fig. 2,) formed in the main frame, while the opposite end is supported by a sliding rod 259, mounted in suitable apertured lugs of the main frame and having a thumb-piece 259ª at its forward end by which it may be operated. Said slide 257 is connected to the main frame by a coil-spring 261, the tension of which tends to normally draw said slide forward. The end of the slide which is connected to said rod is provided with a vertical pin or stud 262, which projects into an angular slot 263, (see Figs. 2 and 10, (formed in a block 264, which is mounted upon the slide or carriage 204. When said rod 259 is moved forward, the pin 262 will strike the wall of the slot 263, and thus move the carriage 204 to one side, as and for the purposes hereinbefore described. The said rod 259 is provided with a block 264ª fast thereto and having a vertical arm 265, which in turn is provided near its upper end with a laterally-projecting stud 266. This stud normally projects into a V-shaped groove 267, (see Figs. 2 and 15,) formed in an arm 268, which in turn is fast upon a disk 269, so as to move therewith. This disk is fast to a short shaft 270, which is journaled in a sleeve 271, mounted on the main frame, and is provided at one end with an operating crank-handle 272. The said shaft 270 is held in its normal position by a helical spring 273, fast to said shaft and connected to an angular bracket 274, mounted on the sleeve 271. This bracket further supports a pivoted pawl 274ª, which is formed in its rear side with a notch 275, into which a spring 276, also mounted on said bracket, projects, so as to normally hold the pawl in a relatively radial plane to the disk 269. The periphery of this disk is formed with a series of rack-teeth 277 and two notches 278, located at the respective opposite ends of the row of teeth. When the pawl 274 is in engagement with the teeth 277, it is moved into a relatively tangential position with respect to the disk, so that said disk may be only moved in one direction; but when it reaches one of the notches 278 it again assumes its radial position and the movement of the disk may be reversed. When the handle 272 is moved forward, the spring 273 is put under tension, so that when said handle is released it will automatically return to normal position. The outer end of the shaft 270 is provided with a cam-lever 279, which is arranged to strike and depress the arm 246 after the platen-carriage has been moved to its forward position, and thus operate the platen to print the total from the type-wheels. This arm when in normal position rests against a stud 279ª, which acts as a stop for said arm to limit its backward movement under the impulse of the spring 273. The forward-and-backward movement of the said platen-carriage is accomplished, as before described, upon the movement of the disk by the walls of the V-shaped groove formed in the arm 268 and adapted to engage and operate the stud 266. The aforesaid block 264ª further carries a pivoted spring-pressed pawl 280, which is adapted to engage notches 281 and 282, formed in a stationary bar 283, and thus aline and temporarily hold the platen-carriage in the positions to which it is moved. This bar 283 is rigidly mounted on the main frame in any suitable manner. The said arm 268 further carries a pin 284, which is so located as to coöperate with a hook-bar 285, fast to a slide 286. This slide is slotted, as at 287, to receive an elongated supporting-block 288, formed on the side of the bar 283. The said slide is held in position upon this block by a suitable cap-plate 289, secured thereto by a screw 290.

By means of the above-described devices the slide 286 is moved forward and back at each operation of the handle 272, which is operated for printing the totals. This movement of the slide feeds the paper strip forward, so as to leave a space between the bottom of the column of figures and the total, by means of a pawl 291, pivotally mounted on an arm 292, carried by said slide. This pawl is held in its normal position by a spring 293, which connects it to the arm 292, and is limited in its downward movements by a pin 294, mounted thereon and arranged to engage a nose 295, formed on said arm. Said pawl is adapted to engage a ratchet-wheel 296, fast to the journal end of the roller 209, so as to rotate the latter, and thus feed the paper forward to effect the extra spacing at the bottom of a column of figures. This abnormal feed of the paper, it will be observed, only takes place when a total is to be printed. A guard-plate or apertured trough 297 is supported by the chute 222 and is arranged to guard the inking-ribbon and prevent the same being caught or torn by the moving bars or type-wheels. The forward ends 298 of the side walls of this trough are inclined, as shown, so as to engage and raise the cross-bar 299 of a yoke 300 when said yoke is drawn rearward by the side bars 253, to which it is pivoted. The ordinary movement of the bars 253 to move the platen-carriage to its different printing positions will not cause the yoke 300 to be raised; but when the platen-carriage is forced rearward past its normal position by the abnormal movement of the rod 259 by its thumb-piece 259ª the yoke is partly raised, as before described, so that a nose 301, (see Fig. 16,) formed on one of the arms of the yoke, will engage a projection 302 on one of the side walls of the trough 297, and thus cause the yoke to turn upon its fulcrums and assume a vertical position and raise the paper strip located above it, so that the printing upon the under side of the strip is visible. When the platen-carriage is thus moved rearward, it contacts with the spring-pressed plate 222ª, and thus clamps the paper strip between it and said plate, so that said strip cannot be accidentally drawn forward. My machine is of course not limited to addition, as by the application of additional numerals to the respective keys multiplication and subtraction may be accomplished in a manner well known in the art— i. e., by a series of additions which embrace the capacity of the machine at each operation.

Having thus described our invention, what we claim as new, and desire to secure by Letters Patent, is—

1. In a calculating-machine, a printing mechanism comprising a series of slidable rack-bars formed with types for printing the details, a totalizing-printer arranged to be operated by said rack-bars and to be moved out of engagement therewith, and a platen for forcing a paper strip against the types.

2. In a calculating-machine, the combination with a printing mechanism arranged to be set to print the detail of each amount, and a second printing mechanism arranged to print the sum-total of all the amounts at each operation of the machine, and a platen adjustable at will so that it may be moved against either the detail or the sum-total types.

3. In a calculating-machine, the combination with a series of keys which act as stops, of a series of detail-printing type-bars arranged to be arrested by the keys, springs for operating said bars when released, and a series of independent total-printing wheels arranged to be actuated by the movements of the bars to set up the details.

4. In a calculating-machine, the combination with two independent amount-printing mechanisms, of paper-holding devices arranged to be moved to bring the columns of figures printed by one printing mechanism into alinement with the types of the remaining printing mechanism.

5. In a calculating-machine, the combination with a series of operating elements, of independent springs for moving the same respectively when released, means for returning said elements to normal position, and devices for relieving said elements of the tensions of their springs during such return movements.

6. In a calculating-machine, the combination with a series of printing rack-bars for printing a detail of each amount registered, of a series of printing-wheels arranged to be operated by said rack-bars and to be moved out of engagement therewith, and adapted to print the sum-total of all the amounts registered.

7. In a calculating-machine, the combination with a printing mechanism comprising a series of types arranged to print a detail of each amount registered, and an independent series of types arranged to print the sum-total of all the amounts registered, and a movable platen adapted to print at will from either of the series of type.

8. In a calculating-machine, the combination with detail-printing types, of total-printing types arranged out of alinement with the first-mentioned types and paper-feeding devices arranged to be moved laterally to bring the figures printed by the detail-types into alinement with the figures printed by the totalizing-types.

9. In a calculating-machine, the combination with reciprocatory detail-printing type-carriers for printing the detail of each amount registered, of total-printing type-carriers for printing the total of all the amounts registered; and means for effecting bodily engagement between said total-carriers and said detail-carriers during one direction of movement of the latter, and for bodily disengaging said two sets of carriers upon the reverse direction of movement of said detail-carriers.

10. In a calculating-machine, the combination with a series of type and rack bars adapted to print in detail each amount registered, of a series of totalizing type-wheels adapted to receive motion from said type and rack bars when the latter are moving in one direction but to be moved bodily out of mesh with the same when they are moving in an opposite direction.

11. In a calculating-machine, the combination with a series of keys, of a printing mechanism comprising spring-set type-bars controlled by said keys and which are set at each operation of the machine to print a detail of the amount registered, independent total-printing types arranged to be set by the movements of the first-mentioned types and means for bodily disengaging the type-bars from the total-printing types.

12. In a calculating-machine, the combination with a series of keys, of a series of detail-printing type and rack bars controlled by the same, a series of total-printing wheels having pinions arranged to be actuated by said bars and means for disengaging the pinions and racks.

13. In a calculating-machine, the combination with a type-carrying device, of means for setting the same to present a plurality of printing-lines; a platen; and means for adjusting said platen to take an impression at any desired printing-line.

14. In a calculating-machine, the combination with a series of type-bars, adapted to print in detail each amount registered, a series of type-wheels arranged to be operated by said bars and adapted to print the sum of all the amounts registered and devices adjustable for printing from either the type-bars or type-wheels at will by forcing a paper strip against the respective types.

15. In a calculating-machine, the combination with a series of type-bars adapted to print in detail each amount registered, of a series of totalizing type-wheels adapted to receive motion from said type-bars when the latter are moving in one direction but be disconnected from the same when they are moving in an opposite direction and a platen for printing from either the type-bars or type-wheels at will.

16. In a calculating-machine, the combination with a series of keys, of a series of detail-printing type-bars controlled by the same, a series of total-printing wheels arranged to be actuated by said bars and means adjustable for printing from either the bars or wheels at will by forcing a paper strip against the respective types.

17. In a calculating-machine, the combination with a series of type-bars adapted to print in detail each amount registered, of a series of type-wheels for printing the totals and arranged to be engaged by said bars but capable of being bodily disengaged therefrom and devices for transferring from one wheel to the other after they are disengaged from the type-bars.

18. In a calculating-machine, a printing mechanism comprising a printing device adapted to print in detail each amount registered, a series of printing-types for printing the totals and arranged to be engaged and operated by the first-mentioned printing device during a portion of its movement, means for altogether disengaging the two printing devices and transfer means between the total-printing types and arranged to actuate the same when they are disengaged from the detail-printing devices.

19. In a calculating-machine, a printing mechanism comprising a printing device adapted to print in detail each amount registered, of a series of printing-wheels for printing the totals and arranged to be engaged and operated by the first-mentioned printing devices, and transfer-bars arranged to be set by the rotation of the type-wheels so as to cause the transfer to take place after said wheels have been disengaged from said printing devices.

20. In a calculating-machine, the combination with a printing device adapted to print a detail of each amount registered, a series of type-wheels arranged to be operated thereby, a series of transfer-bars and projections upon the wheels arranged to operate said bars.

21. In a calculating-machine, the combination with a printing mechanism arranged to print a detail of each amount registered, and also the sum-total of all the amounts registered, of a platen arranged to be moved to print from either the detail or the total printing devices, and means for moving said platen and depressing it at the proper point.

22. In a calculating-machine, the combination with a printing mechanism, of a platen arranged to force a paper strip against the printing mechanism, and means for moving the platen away from printing position and simultaneously and independently raising the paper upon which the printing is being done so as to disclose the printing upon its under side.

23. In a calculating-machine, the combination with a series of type-bars for printing a detail of the amounts registered, of total-printing devices located between said bars and arranged to be actuated thereby and paper-feeding devices arranged to be moved laterally so that the details and the total will be printed in the same columns.

24. In a calculating-machine, the combination with a printing mechanism, of a platen arranged to be actuated to force a paper strip into contact with two different points on said mechanism, and means for moving said platen to the desired position and depressing it upon reaching the same.

25. In a calculating-machine, the combination with a series of rack-bars formed with types, of a series of type-wheels arranged to be operated by said bars, a series of transfer devices between the respective type-wheels and means for moving the type-wheels bodily out of connection with the rack-bars.

26. In a calculating-machine, the combination with a movable frame, a counter mounted on said frame and transfer means arranged to engage and operate the counter upon the movement of the frame.

27. In a calculating-machine, the combination with a counter, of transfer devices, a movable frame and yielding means mounted on said frame and arranged to actuate said transfer devices under a spring tension.

28. In a calculating-machine, the combination with operating devices, of a movable frame, counter-wheels mounted on said frame and arranged to engage the operating devices, and transfer-bars arranged to be set by the rotation of said wheels and operated by the movements of the frame.

29. In a calculating-machine, the combination with operating devices, of a counter, transfer-levers, a movable frame and yielding devices mounted on said frame and arranged to engage said levers to operate them under spring tension.

30. In a calculating-machine, the combination with operating devices, of a counter, a series of transfer-levers, latches for said levers, a movable frame and yielding devices mounted on said frame and arranged to operate said levers when they are unlatched but to yield when they are latched.

31. In a calculating-machine, the combination with operating devices, of a movable frame, counter-wheels mounted on said frame and arranged to engage the operating devices, sliding transfer-bars arranged to engage and operate the wheels when the movable frame is operated and projections on the wheels arranged to engage and set said bars when said wheels are rotated.

32. In a calculating-machine, the combination with a series of type-bars adapted to print in detail each number registered, of a series of type-wheels arranged to be actuated by said bars, means for moving said wheels out of connection with said bars, transfer devices arranged to be set by said wheels while in connection with the bars and transfer devices arranged to be set by the movements of said wheels while not in connection with the bars.

33. In a calculating-machine, the combination with a series of operating elements, of spring means for moving the same when released, means for returning the elements to normal position, and devices for relieving said elements of the tensions of the springs during their return movements.

34. In a calculating-machine, the combination with a main frame, of a counter-frame movable thereon, a counter on said latter frame and movable transfer-bars mounted on the main frame and arranged to engage and operate the counter upon the movement of the counter-frame.

35. In a calculating-machine, the combination with a printing mechanism of a platen arranged in a horizontal plane and adapted to cause the printing of the amounts registered, by forcing the paper into contact with the printing mechanism, devices for feeding a strip of paper over said mechanism and means for reversing said paper without feeding the same forward so that the printing upon the under side of the same may be examined and the paper then returned to its original position.

36. In a calculating-machine, the combination with a movable frame, of a counter mounted thereon, transfer devices arranged to actuate the counter by the movement of the frame, levers for operating said devices and latches for said levers arranged to be operated by said counter.

37. In a calculating-machine, the combination with operating devices, of a series of counter-wheels arranged to be operated by said devices, transfer devices arranged to be set by the movements of the counter-wheels while in connection with the operating devices, means for moving said counter-wheels out of connection with the operating devices and transfer devices arranged to be set by the movements of said wheels by the first-mentioned transfer devices.

38. In a calculating-machine, the combination with a series of type-bars, of a series of type-wheels located between said bars and arranged to be actuated thereby, a movable paper-feeding device, a platen for forcing the paper against the types of either the bars or the wheels at will and means for moving the paper-feeding device laterally to cause the totals printed by the wheels to come in alinement with the columns of figures printed by the bars.

39. In a calculating-machine, the combination with an operating mechanism, of a counter arranged to be actuated thereby, means for moving said counter out of connection with the operating mechanism, transfer devices arranged to be set by said counter while in connection with the operating mechanism and transfer devices arranged to be set by the movements of the counter when not in connection with the operating mechanism.

40. In a calculating-machine, the combination with a series of keys, of a series of type-bars controlled by the same, a movable frame, a series of type-wheels mounted on said frame, means for moving said frame for throwing the type-wheels either into or out of connection with the type-bars.

41. In a calculating-machine, the combination with a series of keys, of a slidable key-bar having graduated stop projections formed thereon and arranged to coöperate with said keys, an actuating-lever connected to said bar and registering devices connected to said lever.

42. In a calculating-machine, the combination with a series of keys, of a slidable key-bar having graduated stop projections formed thereon, a latch-plate for said key-bar arranged to be operated upon the operation of any one of said keys, registering devices and means connecting said bar and registering devices.

43. In a calculating-machine, the combination with a series of keys, of movable type-bars controlled by the same, a series of type-wheels arranged to be operated by said bars, means for moving said wheels out of connection with said bars and transfer devices between said wheels for operating them when out of connection with said bars.

44. In a calculating-machine, the combination with a series of keys, of a slidable key-bar the movements of which are limited by said keys, a lever for moving said bar, a spring for moving said lever, a slidable type-bar and a pivoted link connecting said bar and lever.

45. In a calculating-machine, the combination with a series of keys, of a sliding key-bar having graduated projections formed thereon and which coöperate with said keys, a sliding type-bar and means connecting the key-bar and type-bar.

46. In a calculating-machine, the combination with a series of keys, of a slidable key-bar having graduated projections formed thereon and arranged to coöperate with said keys, means mounted on the bar for holding the key in its operated position and a registering mechanism connected to said bar.

47. In a calculating-machine, the combination with a series of keys, of a sliding key-bar having graduated projections, a type-bar, a totalizing type-wheel arranged to be operated by said bar and means for connecting the key-bar and type-bar.

48. In a calculating-machine, the combination with a series of keys, of a slidable key-bar having graduated stops formed thereon and which coöperate with said keys, a lever connected to said bar, a spring for operating said lever, a latch for said bar arranged to be operated by said keys and a registering mechanism connected to said lever.

49. In a calculating-machine, the combination with a series of keys, of a slidable key-bar having graduated projections formed thereon and arranged to coöperate with said keys, a lever connected to said bar, a spring for operating said lever, means for putting said spring under tension at will, and a registering device connected to said lever.

50. In a calculating-machine, the combination with a series of keys, of a movable key-bar having graduated projections arranged to coöperate with said keys, a latch for said bar arranged to be operated by said keys, means on said bar arranged to engage the operated key and hold it in its depressed position until the bar returns to normal position, a registering device, and means connecting said device to the key-bar.

51. In a calculating-machine, the combination with a series of keys, of a movable key-bar having graduated stop projections arranged to coöperate with said keys, a flange on said bar arranged to engage and lock the keys in their depressed positions, a registering mechanism and means connecting said bar and mechanism.

52. In a calculating-machine, the combination with a series of keys arranged in banks, slidable key-bars having graduated stop projections formed thereon and coöperating with the respective banks of keys, a registering mechanism, levers connected to said bars and also to said registering mechanism, and devices for simultaneously returning all of said levers to normal position after being operated.

53. In a calculating-machine, the combination with a series of keys having locking projections, of a slidable key-bar having graduated stop projections formed thereon and an overhanging slotted key-locking flange, a registering mechanism, and means connecting said bar and mechanism.

54. In a calculating-machine, the combination with a series of keys, of a key-bar coöperating with said keys, a lever connected to said bar, a spring-pressed plunger-rod for operating said lever, means for resetting said lever against the action of said rod, and a registering mechanism connected to said lever.

55. In a calculating-machine, the combination with a series of operating-levers, of a series of springs arranged to engage the same, means for returning said levers to normal positions when operated, and devices for disengaging said springs from said levers when the latter are being returned to normal position.

56. In a calculating-machine, the combination with a series of keys, of an operating-lever, means connecting said lever and keys, a spring arranged to engage said lever to actuate it in one direction, and means for moving the spring out of the path of the lever upon its return movement.

57. In a calculating-machine, the combination with a pivoted operating-lever, a registering device connected thereto, a spring for operating said lever to effect the registration, an auxiliary spring for assisting the initial movement of said lever and means for setting said auxiliary spring independently of the movements of the lever.

58. In a calculating-machine, the combination with a series of keys, of a slidable key-bar arranged to coöperate with said keys, a registering mechanism, an operating-handle therefor, means connecting said bar to said mechanism, and devices for moving said bar to release an operated key independently of the regular operation of the handle.

59. In a calculating-machine, the combination with a series of keys, of a series of slidable key-bars having key-locking devices, graduated stops on said bars arranged to coöperate with said keys, a series of independently-mounted levers connected to said bars, a series of springs for actuating said levers in one direction to move said bars and also effect the registration, a registering mechanism connected to said levers, and a handle and connections for operating the machine and moving the levers back to their normal positions.

60. In a calculating-machine, the combination with a series of keys, each having a transverse groove formed therein, of a movable key-bar having graduated stop projections which are arranged to pass through the key-grooves only when the keys are in normal position, a registering mechanism and means connecting said registering mechanism and bar.

61. In a calculating-machine, the combination with a series of keys, of a key-bar coöperating therewith, a lever connected to said bar, a spring engaging said lever and means for moving said spring upon each operation of the machine independently of the movements of the lever to throw its tension on or off.

62. In a calculating-machine, the combination with a series of keys, of a sliding key-bar arranged to coöperate with said keys, a registering mechanism, an operating-handle, means connecting said bar to said mechanism, means for operating said bar to release the operated keys upon each operation of the machine and an independent device for moving the bar to release the keys independently of the regular operation of the machine by the handle.

63. In a calculating-machine, the combination with a series of keys, of a pivoted operating-lever, means connecting said lever and keys, a spring for assisting the initial movement only of said lever, and means for moving said spring out of the path of the lever.

64. In a calculating-machine the combination with a counter, of a series of transfer devices, a sliding frame and a series or graduated spring-pressed plungers mounted on said frame and arranged to successively engage and operate the transfer devices when the latter are released, but simply yield when they are not released.

65. In a calculating-machine, the combination with a series of keys, of a key-bar coöperating therewith, a lever connected to said bar, a registering mechanism connected to said lever, a spring for operating said lever, devices for returning said lever to normal position and means for operating said devices and simultaneously moving the spring out of the path of the lever.

66. In a calculating-machine, the combination with a series of keys, of a key-bar coöperating therewith, a registering mechanism, devices for connecting the key-bar and registering mechanism, a spring for operating said devices, means for returning said devices to normal position and means for removing the tension from the spring during such operation.

67. In a calculating-machine, the combination with a series of keys, of type-bars, means controlled by the keys for operating said bars, type-wheels arranged to be operated by said bars, a platen arranged to print from either the type-bars or type-wheels at will, and a reciprocating carriage having a projection arranged to operate said platen.

68. In a calculating-machine, the combination with a printing mechanism, of a platen arranged to print from two different points on the same and a movable carriage having a projection arranged to depress said platen.

69. In a calculating-machine, the combination with a printing mechanism, of a platen-carriage, a vertically-movable platen mounted on the same, an operating-carriage, and a projection mounted on said latter carriage and arranged to strike and depress the platen.

70. In a calculating-machine, the combination with a movable frame, a series of counter-wheels mounted thereon, pinions on said wheels and transfer-bars arranged to be moved by said wheels into the paths of said pinions so as to effect a transfer upon the operation of the movable frame.

71. In a calculating-machine, the combination with a series of type-bars adapted to print in detail each number registered, rack-teeth on said bars, a series of type-wheels for printing the totals, pinions on said wheels arranged to mesh with said racks, means for withdrawing the pinions out of mesh with said racks, and devices for printing from either the wheels or the bars at will.

72. In a calculating-machine, the combination with operating devices, of a series of counter-wheels arranged to be operated thereby, transfer-bars arranged to be set by the movements of said wheels by the operating devices, and operating-levers independent of the regular setting movements of the transfer-bars for setting said transfer-bars after said wheels have been disengaged from the operating devices.

73. In a calculating-machine, the combination with a series of type-bars, of a series of total-printing type-wheels arranged to be actuated thereby, a movable platen, a paper-feeding device, means for operating the platen to cause it to print from the type-bars, and an independent device for moving the platen to print from the type-wheels and also for simultaneously moving the paper-feeding devices laterally.

74. In a calculating-machine, the combination with a series of type-bars, of a series of total-printing type-wheels arranged to be actuated thereby, a paper-feeding device, a platen and device for raising the paper at will so that the characters printed upon its under side may become visible.

75. In a calculating-machine, the combination with a printing mechanism adapted to print both a detail of each amount registered and the sum-total of all the amounts registered, a movable platen, a paper-feeding device, means for operating the platen to cause it to print from the detail-types and an independent device for moving the platen to print from the totalizing-types and also for simultaneously moving the paper-feeding devices laterally.

76. In a calculating-machine, the combination with a series of type-bars, of a series of total-printing type-wheels arranged to be actuated thereby, a platen mounted on a movable carriage, an operating-handle for adjusting said carriage to the desired printing position and means connected to said handle for depressing the platen after it is adjusted.

77. In a calculating-machine, the combination with a printing mechanism, of a movable carriage, a platen mounted on said carriage and devices for moving the platen-carriage and simultaneously raising a paper strip upon which the printing is being done so that the under side of the same becomes visible.

78. In a calculating-machine, the combination with a series of type-bars, of a series of total-printing type-wheels arranged to be actuated thereby, a movable carriage, a movable platen mounted on said carriage, means for moving said carriage and depressing the platen and independent means for depressing the platen without moving the carriage.

79. In a calculating-machine, the combination with a series of type-bars, of a movable frame, a series of type-wheels mounted on said frame, and adapted to be operated by said bars, when the movable frame is in its elevated position, a series of sliding transfer-bars arranged to actuate the type-wheels when the movable frame is depressed and projections on the type-wheels adapted to engage and operate said bars.

80. In a calculating-machine, the combination with a series of counter-wheels, of transfer-bars, levers for operating said bars, two sets of latches for said levers and means for operating said latches by the movement of the counter-wheels to release the operating-levers.

81. In a calculating-machine, the combination with a series of counter-wheels, of a series of transfer-bars arranged to be operated by said wheels, a series of operating-levers for said bars, and latches for the respective levers, each of which is arranged to be operated by the lever preceding the one it locks.

82. In a calculating-machine, the combination with a counter, of a series of transfer-levers and latches for said levers, each of which is arranged to be operated by a lever adjoining the one it locks.

83. In a calculating-machine, the combination with a counter, of a series of transfer-levers, latches for locking said levers, arranged to be operated by the counter and other latches for said levers each of which is arranged to be operated by a lever adjoining the one it locks.

84. In a calculating-machine, the combination with a counter, of a series of transfer-bars, a series of transfer-levers and latches for locking said levers arranged to be each operated both by a transfer-bar and by a lever adjoining the one it locks.

85. In a calculating-machine, the combination with a counter, of a series of transfer-bars arranged to be operated by said counter, a series of latch-bars also arranged to be operated by the counter, a series of transfer-levers and a series of latch-levers each of which is arranged to be operated both by a transfer-bar and the lever adjoining the one it locks.

86. In a calculating-machine, the combination with a counter, of a series of transfer-bars, a series of levers for returning said bars to normal position and means for returning all of said levers to normal position upon the operation of the machine.

87. In a calculating-machine, the combination with a counter, of a series of transfer-bars, a series of transfer-levers, a series of latch-levers for said transfer-levers and arranged to operate the transfer-bars, and means for operating all of the latch-levers upon each operation of the machine.

88. In a calculating-machine, the combination with a counter, of a series of transfer-levers, a series of slidable transfer-bars arranged to be operated by said levers, pivoted pawls mounted on said levers and latch-bars coöperating with said pawls and arranged to be operated by the counter.

89. In a calculating-machine, the combination with a counter, of transfer-bars having beveled ends, transfer-levers having projections which engage said ends, and means for operating said transfer-levers.

90. In a calculating-machine, the combination with a counter, of a series of transfer devices, a movable frame, and graduated independently-yielding means mounted on said frame and arranged to successively actuate the transfer devices under spring tension when said transfer devices are released, but simply yield when they are not released.

91. In a calculating-machine, the combination with a counter, of a series of transfer-levers, a spring-pressed frame arranged to be engaged by said levers, independent springs connecting said frame and levers, and means for operating said levers.

92. In a calculating-machine, the combination with a counter, of a series of transfer-levers, a movable frame, and a series of spring-pressed plungers mounted in said frame and arranged to engage and operate said levers upon the movement of the frame.

93. In a calculating-machine, the combination with a counter, of a series of transfer-levers, a series of transfer-bars for the same, and a series of pawls arranged to engage the respective bars to hold them in the operative or inoperative positions to which they are moved.

94. In a calculating-machine, the combination with a printing mechanism, of a movable platen, a yielding device over which the paper is to pass and means for moving the platen to clamp the paper between it and the yielding device so that the paper will not be accidentally drawn forward while being examined.

95. In a calculating-machine, the combination with a printing mechanism, of a paper-feeding device comprising slotted standards, feeding-rollers mounted in said standards, and spring-pressed arms having slotted ends which embrace the journals of one of said rollers to hold it yieldingly in place.

96. In a calculating-machine, the combination with a printing mechanism, of a paper-feeding device and a slide carrying a pivoted yoke arranged to raise the paper when the slide is moved longitudinally so that the under side of the same may be examined.

97. In a calculating-machine, the combination with a counter, of transfer-levers, devices for operating said levers, and means for operating the machine detachably coupled to said devices so as to move the latter only during a portion of the movement of the machine.

98. In a calculating-machine, the combination with operating devices, of a series of counter-wheels arranged to coöperate therewith, cam-disks upon the respective wheels, transfer-bars, pivoted levers arranged to operate said bars, and locking devices for said levers arranged to be operated by said cam-disks.

99. In a calculating-machine, the combination with operating devices, of a series of counter-wheels arranged to coöperate therewith, cam-disks upon the respective wheels, transfer-bars, means mounted on said wheels for moving said bars into transferring position, pivoted levers arranged to operate said bars independently of the counter-wheels and locking devices for said levers arranged to be operated by said cam-disks.

100. In a calculating-machine, the combination with operating devices, of a series of counter-wheels arranged to coöperate therewith, a series of transfer-bars, a series of levers for operating said bars, a movable frame and a series of yielding devices mounted on said frame and arranged to engage said levers.

101. In a calculating-machine, the combination with operating devices, of a series of counter-wheels arranged to coöperate therewith, a series of transfer-levers, latches for said levers arranged to be operated by said wheels, and means for moving said levers when they are unlatched.

102. In a calculating-machine, the combination with a counter, of a series of transfer-levers, a movable frame and a series of yielding devices mounted on said frame and arranged to engage and operate said levers under a spring tension.

103. In a calculating-machine, the combination with an operating mechanism, of a counter, transfer devices arranged to be set by the counter, means for setting the transfer devices independently of the counter and by the movement of the operating mechanism when a double transfer is necessary, and latches for said means arranged to be tripped by the counter.

104. In a calculating-machine, the combination with a type-carrying device; of means for setting the same to present a plurality of printing-lines; an adjustable platen; and a plurality of manually-operative means corresponding to said plurality of printing-lines, for controlling the operation of said platen after the same has been adjusted to the proper printing-line.

105. In a calculating-machine, the combination with a counter mounted in a movable frame, of a turn-to-zero device arranged to coöperate with said counter only when the frame is in a determined position and means for positively arresting said frame at will at such position.

106. In a calculating-machine, the combination with operating devices, of a series of counter-wheels arranged to coöperate therewith, a series of transfer-levers, latches for said levers arranged to be operated by said wheels, devices for relatching said levers upon each operation of the machine and means for operating said levers when they are unlatched.

107. In a calculating-machine, the combination with a counter, of transfer-levers, a movable frame carrying devices for operating said levers, a movable device for operating all of said frame, and means connecting said device to said frame whereby the latter is only moved during a portion of the movement of the former.

108. In a calculating-machine, the combination with a counter comprising a shaft, a series of counter-wheels thereon, means for connecting said wheels and shaft of a longitudinally-movable shaft arranged to be coupled to the first-mentioned shaft, a stationary grooved plate, and a projection mounted on the longitudinally-movable shaft and normally projecting into the groove of said plate to prevent rotation of the shaft.

109. In a calculating-machine, the combination with a counter comprising a shaft, a series of counter-wheels mounted thereon, and means for connecting said wheels and shaft, of a turn-to-zero shaft arranged to be coupled to the first-mentioned shaft at will, a stationary disk having stop-shoulders, and a spring connected to the turn-to-zero shaft and arranged to coöperate with said shoulders.

110. In a calculating-machine, the combination with a counter comprising a shaft, and a series of counter-wheels mounted thereon, of means for connecting said wheels and shaft, a longitudinally-movable shaft arranged to be coupled to the first-mentioned shaft, a stationary grooved cam-disk having stop-shoulders, an arm fast to said longitudinally-movable shaft, and arranged to enter the groove of the disk and a spring mounted on said arm and arranged to engage the periphery of said disk.

111. In a calculating-machine, the combination with a series of keys, of bars controlled by said keys, a series of operating-levers connected to said bars, a counter connected thereto, a device for positively engaging and returning all of said levers to normal position after being operated and means for operating said device only during a portion of the movement of the machine.

112. In a calculating-machine, the combination with a series of keys, of a series of key-bars coöperating therewith, a series of type-bars, means connecting said key-bars and type-bars, a series of type-wheels arranged to be operated by said bars and a platen arranged to print from either the type-bars or type-wheels at will.

113. In a calculating-machine, the combination with a series of operating elements, of a series of springs for operating the same when released, means for returning the elements to normal position, and devices for relieving said elements of the spring tension during their return movements but arranged to again apply said tension when the elements have reached normal position.

114. In a calculating-machine, the combination with an operating mechanism, of a series of counter devices arranged to be actuated by said mechanism, transfer devices arranged to be set by said counter devices, levers for operating said transfer devices, and latches for said levers arranged to be released by independent devices operated by said counter devices.

115. In a calculating-machine, the combination with an operating mechanism, of a series of counter devices arranged to be actuated by the same, transfer means arranged to be set by said counter devices, movable means for operating said transfer devices, latches for said transfer devices and independent mechanism operated by the counter devices for releasing said latches.

116. In a calculating-machine, the combination with an operating mechanism, of a series of counter-wheels arranged to be actuated by the same, means for moving the wheels out of connection with said mechanism, transfer devices arranged to be set by said wheels, and independent means for setting the transfer devices when a double transfer is necessary, said means being arranged to be released by the movements of said first-mentioned transfer devices and actuated to set the transfer devices by the operating mechanism.

117. In a calculating-machine, the combination with an operating mechanism, of a counter, a series of transfer devices, latches for said devices, and a series of movable yielding devices arranged to operate the transfer devices when they are unlatched but to yield when they are latched.

118. In a calculating-machine, the combination with operating mechanism, of a movable frame, a counter mounted on said frame and comprising counter-wheels having operating-pinions, transfer devices set by said counter-wheels to project into the paths of the pinions so that the latter will be operated upon the movement of the frame.

119. In a calculating-machine the combination with operating devices, of a movable frame, a counter mounted on said frame, and transfer means arranged to be set by the counter and operated to transfer by the movement of said frame.

120. In a calculating-machine, the combination of a printing mechanism, a slide, a paper-raising device mounted on said slide and a stationary cam projection arranged to operate said device when the slide is actuated.

121. In a calculating-machine, the combination with a printing mechanism, of a slide carrying a platen, and a paper-raising device mounted on said slide and arranged to elevate the paper when the slide is operated to move the platen back from printing position.

122. In a calculating-machine, the combination with a series of keys, of slidable bars having graduated projections which coact with said keys, a series of spring-pressed levers connected to said bars and arranged to operate them when they are released by the keys, and a series of slidable type-bars also connected to said levers.

123. In a calculating-machine, the combination with a series of keys, of a series of slidable bars having graduated projections arranged to coact with said keys, pivoted levers connected to said bars, a series of slidable rack-bars connected to said levers and totalizing type-wheels arranged to be operated by said bars.

124. In a calculating-machine, the combination with a series of keys, of a series of slidable bars having graduated projections which coact with said keys, a series of slidable type-bars, levers connecting the two series of bars, and type-wheels for printing the totals arranged to be operated by said bars.

125. In a calculating-machine, the combination with a series of keys, of a series of slidable bars having graduated projections which coact with said keys, a series of slidable type-bars and pivoted levers connecting the first-mentioned bars and said type-bars.

126. In a calculating-machine, the combination with detail-printing types, of independent total-printing types out of alinement with the detail types and means for causing the totals to be printed in alinement with the details.

127. In a calculating-machine, the combination with a series of type-bars, of a series of type-wheels, means for moving the type-wheels into and out of connection with the bars, transfer devices arranged to be set by the wheels when in connection with the bars and means for operating said devices when the wheels are out of connection with the bars.

128. The combination with a series of keys, of lateral projections on the key-shanks, a pivoted wing in the path of the shanks, a locking-plate which is controlled by the pivoted wing; said locking-plate being provided with projections for coöperating with the key-shanks and means for forcing the locking-plate forward whenever the pivoted wing is depressed.

129. In a calculating-machine, the combination with a series of slidable type-bars formed with rack-teeth and arranged for printing a detail of each amount registered, of a movable frame, a series of type-wheels mounted on said frame and carrying pinions arranged to engage said rack-teeth and transfer devices between said wheels arranged to be operated by the movements of the frame.

130. The combination with a series of independently-movable keys, of lateral projections extending from the key-shanks, a pivoted wing in the path of the keys, a locking-plate which is held in a retracted position by said wing, and means on said plate for locking a depressed key in its lowered position and the rest of the keys in that series in their elevated positions.

131. In a calculating-machine, the combination with a printing mechanism, arranged to print both the details and the total, of a paper-holder, a platen arranged to be moved to print either the details or the total, and a special device for effecting the printing of the total arranged to move the platen to the proper position and also move the paper-holder laterally.

132. In a calculating-machine, the combination with a printing mechanism arranged to print both the details and the total, of a paper-holder, and a special device for effecting the printing of the total arranged to move the paper-holder laterally.

133. In a calculating-machine, the combination with a series of slidable bars having types upon their upper edges and rack-teeth upon their lower edges, of a movable frame and totalizing type-wheels carried by said frame and arranged to be moved into and out of mesh with the rack-teeth.

134. In a calculating-machine, the combination with a series of slidable bars having type upon their upper edges and rack-teeth upon their lower edges, of a series of totalizing type-wheels arranged to be moved into and out of mesh with the rack-teeth.

135. In a calculating-machine, the combination with a series of type-bars having rack-teeth, of a rock-frame, and a series of totalizing type-wheels mounted on said frame and arranged to be moved thereby into connection with the rack-teeth when the type-bars are moving in one direction and out of such connection when they are moving in an opposite direction.

136. In a calculating-machine, the combination with a series of type-bars having rack-teeth, of a series of totalizing type-wheels arranged to receive motion from said racks when they are moved in one direction but be disconnected from the same when they are moved in an opposite direction.

137. In a calculating-machine, the combination with a printing mechanism arranged to print both the details and the total, of a paper-holder and a special device for effecting the printing of the total arranged to feed the paper forward and move the paper-holder laterally.

138. In a calculating-machine, the combination with slidable type-bars arranged to print a detail of each amount added, of an independent printing mechanism arranged to print the sum-total of all the amounts added and a single platen arranged to be moved to print from either the type-bars or printing mechanism at will.

139. In a calculating-machine, the combination with a series of slidable bars having printing-types, of a series of type-wheels arranged to be operated by said bars, a slidable carriage and a platen mounted on said carriage and arranged to be brought into coöperative relation with the desired set of types by the movement of said carriage.

140. In a calculating-machine, the combination with two independent sets of printing-types, of a slidable carriage, a movable platen mounted on said carriage and means for moving the carriage to bring the platen into the proper position and then depress it into contact with the desired set of types.

141. In a calculating-machine, the combination with two independent sets of printing-types, of a single platen arranged to be moved to print from either set of type at will, a carriage carrying said platen, and an operating-handle arranged to move the carriage and subsequently depress the platen.

142. In a calculating-machine, the combination with an operating mechanism, of a counter, a series of transfer-bars, a series of operating-levers, a latch for each of said levers arranged to be operated by the adjoining lever, and a movable frame carrying a series of graduated lever-operating devices.

143. In a calculating-machine, the combination with an operating mechanism, of a counter, a series of transfer-bars, a series of levers for operating said bars, and a series of pivoted latches arranged to lock said levers and also return them to normal position after they are operated.

144. In a calculating-machine, the combination with an operating mechanism, of a counter, transfer-bars, levers for operating said bars, a latch for each lever arranged to be operated by an adjoining lever, and additional latches for the levers arranged to be operated by the counter elements.

145. In a calculating-machine, the combination with an operating mechanism, of a series of counter-wheels, a series of transfer-bars arranged to be set by said wheels, a series of levers for operating said bars, latches for said levers arranged to be operated by said wheels and an additional latch for each lever arranged to be operated by an adjoining lever.

146. In a calculating-machine, the combination with an operating mechanism, of a counter, transfer-bars, a series of levers for operating said bars, and a latch for each lever arranged to be operated by an adjoining lever.

147. In a calculating-machine, the combination with an operating mechanism, of a series of counter-wheels mounted in a movable frame, a series of transfer-bars arranged to be drawn into operative position by said wheels, so as to turn the wheels when the frame is moved, operating-levers for said bars, and latches for said levers arranged to be tripped by said wheels.

148. In a calculating-machine, the combination with an operating mechanism, of a series of counter-wheels, transfer-bars, projections on the wheels arranged to draw the bars into operative positions, levers for forcing said bars into operative positions and latches for said levers arranged to be tripped by said wheels.

149. In a calculating-machine, the combination with an operating mechanism, of a series of counter-wheels, a series of transfer-bars, projections on the wheels for drawing the bars into operative position and pivoted levers also arranged to move said bars into operative position.

150. In a calculating-machine, the combination with operating devices, of a movable frame, counter-wheels mounted on said frame and arranged to engage the operating devices, sliding transfer-bars arranged to engage and operate the wheels when the movable frame is operated, and pivoted levers for setting said bars.

151. In a calculating-machine, the combination with operating devices, of a counter, a series of transfer-levers, latches for said levers, a movable frame, independent spring-pressed plungers mounted on said frame, and arranged to operate said levers when they are unlatched but to yield when they are latched.

152. In a calculating-machine, the combination with operating devices, of a counter, a series of transfer-levers, latches for said levers, a movable frame and independent yielding devices mounted on said frame and arranged to operate said levers when they are unlatched but to yield when they are latched.

153. In a calculating-machine, the combination with a series of type-bars, of a series of type-wheels arranged to be operated thereby, a series of sliding transfer-bars arranged to be set by said wheels, and a series of pivoted levers arranged to be operated by said bars.

154. In a calculating-machine, the combination with a printing mechanism, of a slide, a paper-raising yoke pivoted on said slide, and a stationary cam projection arranged to elevate said yoke when the slide is operated.

155. In a calculating-machine, the combination with two independent amount-printing mechanisms both arranged to be set for printing at each operation of the machine, of a paper-feeding device arranged to be moved to bring the columns of figures printed by one printing mechanism into alinement with the types of the remaining printing mechanism.

156. In a calculating-machine, the combination with a series of keys having shanks provided with laterally-projecting pins, of slidable bars having graduated stop projections and notched flanges which latter coöperate with said pins to hold the keys in their operated positions and registering mechanism connected to said bars.

157. In a calculating-machine, the combination with a series of keys, of a slidable key-bar having graduated stop projections formed thereon and arranged to coöperate with said keys, a spring-actuated lever connected to said bar, a type-bar connected to said lever, and a type-wheel arranged to be operated by said bar.

158. In a calculating-machine, the combination with a series of keys, of a series of type-bars controlled by the same, a movable frame, a series of type-wheels mounted on said frame, means for moving the frame and throwing the type-wheels either into or out of connection with the type-bars.

159. In a calculating-machine, the combination with a series of keys, of a series of type-bars spring-actuated levers connected to said bars, means connected to the levers and controlled by the keys, a series of type-wheels arranged to be operated by said bars and means for throwing the type-wheels either into or out of connection with the type-bars.

160. In a calculating-machine, the combination with a series of keys, a series of type-bars controlled by the keys, spring devices for moving said bars, a series of type-wheels and means for throwing the type-wheels either into or out of connection with the type-bars.

161. In a calculating-machine, the combination with operating devices, a counter arranged to be operated by the same, transfer devices arranged to be set by the movements of the counter while in connection with the operating mechanism, means for moving said counter out of connection with the operating mechanism and transfer devices arranged to be set by the movement of said wheels by the first-mentioned transfer devices.

162. In a calculating-machine, the combination with a counter, of transfer devices, a movable frame and a series of independent graduated yielding devices mounted on said frame and arranged to successively actuate said transfer devices under spring tension.

163. In a calculating-machine, the combination with an operating mechanism, of a counter arranged to be moved into and out of connection therewith, a series of transfer-bars, operating-levers, latches for said levers arranged to be operated while the counter is in connection with the operating mechanism, and additional latches for said levers arranged to be operated when the counter is out of connection with the operating mechanism.

164. In a calculating-machine, the combination with a printing mechanism, arranged to print a detail of each transaction and the sum-total of all the transactions, of a movable carriage, a movable platen mounted on said carriage, means for operating said platen to print from the detail-type, and independent means for moving the carriage and operating the platen to print from the totalizing-type.

165. In a calculating-machine, the combination with a printing mechanism, of a movable carriage, a movable platen mounted on said carriage, means for operating said platen when the carriage is in normal position and an independent device for moving the carriage and operating the platen in a different position.

166. In a calculating-machine, the combination with a printing mechanism, of a movable carriage, a platen movably mounted thereon, and an operating-handle mounted independently of the carriage and carrying a carriage-shifting device and a platen-operating cam.

167. In a calculating-machine, the combination with a printing mechanism, of a movable carriage, a platen movably mounted thereon, and a handle carrying a cam and arranged to first move the carriage and then cause the cam to engage and operate the platen.

168. In a calculating-machine, the combination with a printing mechanism, of a movable carriage, a platen movably mounted thereon, and a handle mounted independently of the carriage and carrying devices which engage and move the carriage and subsequently depress the platen.

169. In a calculating-machine, the combination with a series of keys, of a series of slidable bars controlled by said keys, so that the bars will move to a greater or less extent according to the value of the key operated, a series of pivoted plates spring-pressed to latch said bars but arranged to be engaged by the keys to release the bars, and registering devices connected to said bars.

170. In a calculating-machine, the combination with a series of keys, of slidable bars controlled by said keys, pivoted latch-plates for said bars arranged under said keys and adapted to be engaged and operated by any one of said keys, and registering devices connected to said bars.

171. In a calculating-machine, the combination with a series of keys having shanks provided with laterally-projecting pins, of a series of slidable bars having notched flanges coöperating with said pins, a series of latch-bars for the respective slidable bars arranged to be operated by the key-shanks, and registering devices connected to the slidable bars.

172. In a calculating-machine, the combination with a series of keys, of a slidable key-bar having graduated projections, a type-bar connected to the key-bar, and a totalizing-wheel arranged to be operated by said type-bars.

173. In a calculating-machine, the combination with a series of keys each having a shank, of a series of bars having graduated projections which coöperate with said shanks, spring-actuated levers connected to said bars, a series of type-bars connected to said levers, and an adding mechanism operated by said type-bars.

174. In a calculating-machine, the combination with a series of keys and connections, of a series of pivoted levers controlled thereby, rack-bars connected to said levers, a series of spring-pressed plungers for operating said levers and a registering mechanism operated by said rack-bars.

175. In a calculating-machine, the combination with a series of keys and connections, of a series of pivoted levers controlled thereby, rigid arms mounted on said levers, a series of spring-pressed plungers engaging said arms and a registering mechanism connected to said levers.

176. In a calculating-machine, the combination with a series of operating-levers, spring devices for operating said levers, and a rocking frame carrying a series of independent springs which engage said levers but may be disengaged therefrom by the rocking of said frame.

177. In a calculating-machine, the combination with a series of operating-levers, of a rocking frame carrying a series of independent springs which engage said levers, and means for rocking the frame to remove the tension of the springs from the levers upon the return movement of the latter.

178. In a calculating-machine, the combination with a series of independently-movable keys, of locking-plates having locking-flanges formed with notches through which the keys pass and common to the several series of keys for locking any depressed key of a series in its lowered position, and the remaining keys of that series in elevated positions, a pivoted frame for returning the locking-plates and a lever for operating said frame and effecting a normal restoration of the locking-plates to release all the depressed keys.

179. In a calculating-machine, the combination with a series of keys each having a transverse groove and a stop-pin, of a movable bar having a locking-flange and graduated stop projections which latter are arranged to pass through said transverse groove when the keys are in normal positions, a registering mechanism and means connecting said mechanism and bar.

180. In a calculating-machine, the combination with an operating mechanism, of a counter mounted on a movable frame and arranged to be moved into and out of connection therewith, a turn-to-zero device mounted independently of the counter and a special key for arresting the movable frame in the proper position for the counter to coöperate with the turn-to-zero device.

181. In a calculating-machine, the combination with an operating mechanism, of a counter mounted on a movable frame and arranged to be moved into and out of connection therewith, an operating-handle and connections and a special key arranged to be moved into the path of the handle connections to arrest the movable frame in the proper position for the counter to coöperate with the turn-to-zero device.

182. In a calculating-machine the combination with a printing mechanism, of a platen arranged to print from two different points on the same, a movable carriage carrying a projection arranged to operate the platen when the latter is in its normal position and an independent device for moving the platen from normal position and then operating it to effect the printing.

183. In a calculating-machine, the combination with a series of type-bars, a series of type-wheels, means for moving the wheels away from the bars, pinions carried by the wheels and transfer-bars arranged to be drawn into operative position by the wheels and to engage and operate the pinions upon the movement of the wheels away from the bars.

184. In a calculating-machine, the combination with a printing mechanism, arranged to print both a detail of each amount and the sum-total of all the amounts, a movable platen, a paper-holding device, means for operating the platen to cause it to print the detail and independent devices for operating the platen to print the total and simultaneously moving the paper-holder to bring the detail and total figures into alinement.

185. In a calculating-machine, the combination with a printing mechanism arranged to print a detail of each amount and the sum-total of all the amounts, of a platen, a paper-holder and means for moving the paper-holder and platen whereby the printed details and total are brought into alinement.

186. In a calculating-machine, the combination with a printing mechanism arranged to print both a detail of each amount and the sum-total of all the amounts, a platen mounted on a movable carriage, a paper-holder, means for operating the platen to cause it to print the details and an independent device for moving the platen to print the total and simultaneously moving the paper-holder to bring the printed details and total into alinement.

187. In a calculating-machine, the combination with a printing mechanism arranged to print both a detail of each amount and the sum-total of all the amounts, a movable carriage, a movable platen mounted on said carriage, means for moving said carriage and depressing the platen and independent means for depressing the platen without moving the carriage.

188. In a calculating-machine, the combination with a counter, of a series of transfer-bars, transfer-levers and a series of latches for said levers arranged to be operated both by said bars and also by the levers adjoining the ones they lock.

189. In a calculating-machine, the combination with a counter, of a series of transfer-bars arranged to be set by the counter elements, a series of levers arranged to operate said bars, and latches for said levers arranged to be operated both by said bars and the levers adjoining the ones they lock.

190. In a calculating-machine, the combination with a counter, of a series of transfer-bars, operating-levers for said bars, latches for said levers arranged to be operated by said bars, auxiliary latches for said levers and independent devices operated by the counter for releasing said latter latches.

191. In a calculating-machine, the combination with a series of counter-wheels, of a series of transfer-bars, a series of transfer-levers arranged to operate said bars, a series of pivoted latches mounted on said levers and a series of slidable latch-bars coöperating therewith and also with the counter-wheels.

192. In a calculating-machine, the combination with a series of counter-wheels, of a series of transfer-bars, a series of transfer-levers arranged to operate said bars, a series of pivoted latches mounted on said levers, a series of latch-bars coöperating with said latches and also with the counter-wheels and pivoted latch-levers also latching the said transfer-levers.

193. In a calculating-machine, the combination with a series of counter-wheels, of a series of transfer-bars arranged to be set by said wheels, a series of operating-levers for said bars and a series of pivoted latches for said levers arranged to be operated by said bars.

194. In a calculating-machine, the combination with a counter, of a series of transfer-bars having beveled ends and a series of operating-levers carrying pins which engage said beveled ends to operate the bars.

195. In a calculating-machine, the combination with a counter, of a series of transfer-bars, a series of pivoted transfer-levers, latching-pawls mounted on said levers, independent devices coöperating with the counter and engaging said pawls and a series of pivoted devices for returning the pawls to normal position.

196. In a calculating-machine, the combination with a counter, of a series of transfer-bars, a series of pivoted transfer-levers, a series of pivoted latches for said levers arranged to be operated by said bars, and a series of independent latches for said levers arranged to be operated by said pivoted latches.

197. In a calculating-machine, the combination with a counter, of a series of transfer-bars, a series of pivoted transfer-levers, latches for said levers arranged to be operated by said bars, and means for returning the latches to normal position upon each operation of the machine.

198. In a calculating-machine, the combination with a series of counter-wheels, of a series of transfer-bars arranged to be moved into operative position by said wheels, a series of operating-levers for said bars, a series of pivoted latches for said levers, a pivoted plate for simultaneously operating all of said latches and means for rocking said plate upon each operation of the machine.

199. In a calculating-machine, the combination with a series of operating devices, a printer mounted in a movable frame and arranged to engage said devices, a platen, a carriage, a handle for operating said carriage and means mounted on the carriage for moving both the counter-frame and the platen.

200. In a calculating-machine, the combination with a series of operating devices, of a printer mounted on a movable frame, a cam-arm fast to said frame, a platen, a carriage, a handle for operating said carriage, and means mounted on said carriage and arranged to operate both the cam-arm and the platen.

201. In a calculating-machine, the combination with a counter, of a series of transfer-levers, a movable frame for operating said levers, a main operating-frame, a latch connecting the two frames and means for tripping the latch after the main frame has made only part of its movement.

202. In a calculating-machine, the combination with a counter, a series of transfer devices, a frame carrying graduated means for operating said devices, a main actuating-frame, and means connecting the two frames whereby the frame carrying the graduated means only moves with said main frame during part of its movement.

203. In a calculating-machine, the combination with an operating mechanism, of a counter, transfer devices arranged to be set by said counters, levers also arranged to set said transfer devices to operative position when a double transfer is necessary, and means connected to the operating mechanism for actuating said levers successively.

204. In a calculating-machine, the combination with an operating mechanism, of a counter, transfer devices arranged to be set by the counter-wheels, levers for also setting said transfer devices to operative position when a double transfer is necessary, two latches for each of said levers, and means controlled by adjoining wheels for releasing said latches.

205. In a calculating-machine, the combination with an operating mechanism, of a counter, transfer devices arranged to be set by the counter-wheels, and independent means for setting the transfer devices to operative position and only brought into play when a double transfer is to take place.

206. In a calculating-machine, the combination with an operating mechanism, of a counter, transfer devices, operating-levers for said devices and two latches for said levers one released by its own counter-wheel and one by the preceding counter-wheel.

207. In a calculating-machine, the combination with an operating mechanism, of a counter, transfer devices arranged to be set to effect the transfer by the movement of the counter-wheels, independent means arranged to set the transfer devices, and latches for said independent means arranged to be released by the counter-wheels.

208. In a calculating-machine, the combination with a series of operating elements, springs for operating said elements when released, and devices for throwing the tensions of the springs upon the operating elements after the latter have entirely returned to normal position.

209. In a calculating-machine, the combination with a series of counter-wheels, of transfer devices between said wheels arranged to be set by the movements of said wheels, means for setting the transfer devices to op rative position independently of the movements of the wheels, and latches for said means controlled by the counter-wheels, said second means becoming operative only when a double transfer is necessary.

210. In a calculating-machine, the combination with detail-printing types, of total-printing types arranged out of alinement with the first-mentioned types, paper-feeding devices, and means for changing the relative positions of the paper-feeding devices and the types so that the total will be printed under the proper columns of the details.

211. In a calculating-machine, the combination with a series of actuating elements, of a series of total-printing type-wheels actuated by said elements and mounted in a movable frame, a series of transfer devices mounted independently of the frame, and means for moving the frame to effect the transfers of the type-wheels by engaging the latter with the relatively stationary transfer devices.

212. The combination with a counter mounted in a movable frame, a series of transfer devices mounted independently of the frame, and means for moving the frame to cause the counter elements to engage the relatively stationary transfer devices and be thereby operated.

213. The combination with a series of counting-wheels mounted in a movable frame, of a series of transfer elements mounted independently of the frame and adapted to be thrown by the counting-wheels into the paths traversed by said wheels upon the movement of the frame.

214. The combination with a series of counter-wheels mounted in a movable frame, transfer devices mounted independently of said frame, means carried by said wheels for drawing the transfer devices into the paths traversed by said wheels upon the movements of the frame, and means independent of the counter-wheels for setting said transfer devices.

215. In a calculating-machine, the combination with an operating mechanism, of a key extending to the exterior of said mechanism and arranged when operated to lock the latter, and normally inaccessible means for releasing said lock from the interior of the mechanism.

216. In a calculating-machine, the combination with detail-printing type-carriers for printing the detail of each amount registered, of total-printing type-carriers for printing the total of all the amounts registered; a paper-supporting carriage; means for taking an impression from the detail-carriers and also from the total-carriers; and means for moving said carriage and automatically determine the positioning of the same to cause the printing from the total-carriers to be made in proper columnated alinement with the detail-printing.

217. In a calculating-machine, the combination with detail-printing type-carriers for printing the detail of each amount registered, of total-printing type-carriers for printing the total of all the amounts registered; a support for the paper; means for causing an impression to be taken from said detail-carriers; means for causing an impression to be taken from said total-carriers; and means controlled by this latter means for changing the relative positions of the paper-support and the total-carriers, whereby to cause the printing from the total-carriers to be made in proper columnated alinement with the detail-printing.

218. In a calculating-machine, the combination with a series of keys, of a series of type-carriers, means intermediate said keys and said type-carriers for setting the latter differentially corresponding to the keys depressed; a platen; means for operating said platen to force a paper strip against said type-carriers; and means for retracting the platen from normal position and for also reversing the paper at the printing-point so that the amount last printed is brought into view.

219. In a calculating-machine, the combination with a series of keys, of a series of type-carriers, means intermediate said keys and said type-carriers for setting the latter differentially corresponding to the keys depressed: a platen; means for operating said platen to force a paper strip against said type-carriers; and means independent of the platen for reversing the paper strip at will so that the printing upon the under side of the same is brought into view.

220. In a calculating-machine, the combination with a printing mechanism, of a platen, an operating-handle for depressing the platen in its normal position, and an auxiliary operating-handle arranged first to move the platen from its normal position and then depress it.

221. In a calculating-machine, the combination with a printing mechanism, of paper-feeding devices, an operating-handle for operating the platen and paper-feeding devices, and an auxiliary operating-handle for moving the platen from its normal position and depressing it and for also operating the paper-feeding devices.

222. In a calculating-machine, the combination with a printing mechanism, of paper-feeding devices, a platen, a handle for operating the platen arranged to also operate the paper-feeding devices, and an auxiliary total-printing handle arranged to operate the platen and also operate the paper-feeding devices to a greater extent than their normal operation by the first-mentioned handle.

223. The combination with a printing mechanism, including a platen and detail and total printing types, of paper-feeding devices, means for feeding the paper when the details are printed, and other means for feeding the paper a greater distance than the first-mentioned means when the totals are printed.

224. In a calculating-machine, the combination with a printing mechanism arranged to print both the details and totals, of paper-feeding devices arranged to move the paper forward and laterally, and a total-printing handle for giving the paper-feeding devices this double movement.

225. In a calculating-machine, the combination with accounting devices of a series operating parts, of operating-springs for the same, and means for returning said parts to their normal positions and subsequently putting the operating-springs under tension.

In testimony whereof we affix our signatures in the presence of two witnesses.

WILLIAM RABICH
GUSTAV REIN.
LEO EHRLICH.

Witnesses:
ALVAN MACAULEY,
ALFRED A. MATHEY.